United States Patent
Koren et al.

(10) Patent No.: US 9,793,739 B2
(45) Date of Patent: Oct. 17, 2017

(54) WIRELESS POWER TRANSMITTING DEVICE

(71) Applicant: SANDISK TECHNOLOGIES INC., Plano, TX (US)

(72) Inventors: Dotan Koren, Mountain View, CA (US); Aran Ziv, Foster City, CA (US); James Petzinger, San Jose, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 122 days.

(21) Appl. No.: 14/018,999

(22) Filed: Sep. 5, 2013

(65) Prior Publication Data

US 2015/0042269 A1 Feb. 12, 2015

Related U.S. Application Data

(60) Provisional application No. 61/863,081, filed on Aug. 7, 2013.

(51) Int. Cl.
| | |
|---|---|
| *H02J 7/00* | (2006.01) |
| *H02J 7/02* | (2016.01) |
| *H02J 17/00* | (2006.01) |
| *H02J 5/00* | (2016.01) |
| *H01F 38/14* | (2006.01) |

(52) U.S. Cl.
CPC ............. *H02J 7/025* (2013.01); *H01F 38/14* (2013.01); *H02J 5/005* (2013.01); *H02J 17/00* (2013.01)

(58) Field of Classification Search
CPC .......... H02J 7/025; H02J 7/0044; H02J 17/00; H02J 5/005

USPC .......................................................... 320/108
See application file for complete search history.

(56) References Cited

U.S. PATENT DOCUMENTS

| | | | |
|---|---|---|---|
| 6,650,088 B1 * | 11/2003 | Webb et al. ................. | 320/115 |
| D603,603 S | 11/2009 | Laine et al. | |
| D607,879 S | 1/2010 | Ferber et al. | |
| D611,407 S | 3/2010 | Webb | |
| D611,408 S | 3/2010 | Ferber et al. | |
| 7,746,028 B1 * | 6/2010 | Yang et al. ................. | 320/107 |
| D624,316 S | 9/2010 | Ferber et al. | |
| 7,804,054 B2 | 9/2010 | Ben-Shalom et al. | |

(Continued)

OTHER PUBLICATIONS

Kharif, Olga. "The Coming War Over Wireless Charging," Bloomberg Businessweek, http://www.businessweek.com/articles/2012-11-08/the-coming-war-over-wireless-charging, Nov. 8, 2012, 3 pages.

(Continued)

*Primary Examiner* — Suchin Parihar
(74) *Attorney, Agent, or Firm* — Toler Law Group, PC

(57) ABSTRACT

A wireless charging device includes a wireless transmitter with an electromagnetic emitting portion. The wireless charging device also includes a seat having a surface and at least one protrusion from the surface. The seat accommodates at least one wireless power receiving device. The seat has an active area that contains the electromagnetic emitting portion. The at least one protrusion is configured as a guide for two sides of the at least one wireless power receiving device for placement over the active area. The placement of the at least one wireless power receiving device over the active area enables transferring of power to the at least one wireless power receiving device.

29 Claims, 16 Drawing Sheets

(56) References Cited

U.S. PATENT DOCUMENTS

| | | | |
|---|---|---|---|
| D625,721 S | 10/2010 | Ferber et al. | |
| 7,906,936 B2 | 3/2011 | Azancot et al. | |
| D639,734 S | 6/2011 | Ferber et al. | |
| 8,049,370 B2 | 11/2011 | Azancot et al. | |
| 8,090,550 B2 | 1/2012 | Azancot et al. | |
| 8,188,619 B2 | 5/2012 | Azancot et al. | |
| 8,193,769 B2 | 6/2012 | Azancot et al. | |
| 8,283,812 B2 | 10/2012 | Azancot et al. | |
| 8,319,925 B2 | 11/2012 | Ben-Shalom | |
| 8,320,143 B2 | 11/2012 | Leibovitz | |
| 8,380,998 B2 | 2/2013 | Azancot et al. | |
| 8,427,012 B2 | 4/2013 | Azancot et al. | |
| 8,441,364 B2 | 5/2013 | Azancot et al. | |
| 8,456,038 B2 | 6/2013 | Azancot et al. | |
| 2006/0238164 A1* | 10/2006 | Rosal et al. | 320/115 |
| 2007/0105599 A1* | 5/2007 | Hsu | 455/573 |
| 2009/0257259 A1 | 10/2009 | Leibovitz | |
| 2009/0273309 A1* | 11/2009 | Kuo | 320/101 |
| 2010/0066176 A1 | 3/2010 | Azancot et al. | |
| 2010/0070219 A1 | 3/2010 | Azancot et al. | |
| 2010/0072825 A1 | 3/2010 | Azancot et al. | |
| 2010/0073177 A1 | 3/2010 | Azancot et al. | |
| 2010/0181841 A1 | 7/2010 | Azancot et al. | |
| 2010/0194336 A1 | 8/2010 | Azancot et al. | |
| 2010/0219183 A1 | 9/2010 | Azancot et al. | |
| 2010/0219693 A1 | 9/2010 | Azancot et al. | |
| 2010/0219697 A1 | 9/2010 | Azancot et al. | |
| 2010/0219698 A1 | 9/2010 | Azancot et al. | |
| 2010/0244584 A1 | 9/2010 | Azancot et al. | |
| 2010/0253282 A1 | 10/2010 | Azancot et al. | |
| 2010/0257382 A1 | 10/2010 | Azancot et al. | |
| 2010/0259401 A1 | 10/2010 | Azancot et al. | |
| 2010/0315041 A1* | 12/2010 | Tan | 320/115 |
| 2011/0062793 A1 | 3/2011 | Azancot et al. | |
| 2011/0086677 A1* | 4/2011 | Jensen | 455/569.1 |
| 2011/0121660 A1 | 5/2011 | Azancot et al. | |
| 2011/0157137 A1 | 6/2011 | Ben-Shalom | |
| 2011/0181238 A1* | 7/2011 | Soar | B60N 2/24 320/108 |
| 2011/0217927 A1 | 9/2011 | Ben-Shalom et al. | |
| 2012/0038619 A1 | 2/2012 | Shraga et al. | |
| 2012/0071091 A1 | 3/2012 | Azancot et al. | |
| 2012/0119708 A1* | 5/2012 | Toya | 320/137 |
| 2012/0119874 A1* | 5/2012 | Ciervo et al. | 340/4.34 |
| 2012/0193993 A1 | 8/2012 | Azancot et al. | |
| 2012/0212073 A1 | 8/2012 | Azancot et al. | |
| 2012/0230521 A1 | 9/2012 | Azancot et al. | |
| 2012/0268064 A1 | 10/2012 | Ostrom et al. | |
| 2013/0021164 A1* | 1/2013 | Heaton | 340/687 |
| 2013/0043833 A1 | 2/2013 | Katz et al. | |
| 2013/0049482 A1 | 2/2013 | Rofe et al. | |
| 2013/0049484 A1 | 2/2013 | Weissentern et al. | |
| 2013/0049682 A1* | 2/2013 | Niec et al. | 320/108 |
| 2013/0062960 A1 | 3/2013 | Rofe et al. | |
| 2013/0083281 A1 | 4/2013 | Ben-Shalom | |
| 2013/0132743 A1 | 5/2013 | Azancot et al. | |
| 2014/0097793 A1* | 4/2014 | Wurtz et al. | 320/108 |
| 2014/0111147 A1* | 4/2014 | Soar | 320/108 |
| 2014/0139178 A1* | 5/2014 | Large et al. | 320/108 |
| 2014/0232343 A1* | 8/2014 | Tadd et al. | 320/114 |
| 2014/0330998 A1* | 11/2014 | Dees et al. | 710/303 |
| 2014/0361751 A1* | 12/2014 | Strauser | 320/137 |
| 2014/0368163 A1* | 12/2014 | Ho | 320/108 |
| 2015/0077927 A1* | 3/2015 | Barnett et al. | 361/679.43 |
| 2015/0097519 A1* | 4/2015 | Chen | 320/108 |

OTHER PUBLICATIONS

"Wireless Power Technology," Wireless Power Consortium, http://www.wirelesspowerconsortium.com/technology/, printed Aug. 7, 2013, 2 pages.

Bastami, Siamak. "Magnetic Induction or Magnetic Resonance for Wireless Charging?," Bodos Power Systems, http://www.powerguru.org/magnetic-induction-or-magnetic-resonance-for-wireless-charging/, printed Aug. 7, 2013, 7 pages.

"Unplugged Energy: Nokia Wireless Charger," Surabayahighlight in Highlights of the Week, http://surabayahighlight.com/highlights-of-the-week/tech-products/unplugged-energy-nokia-wireless-charger-takes-ancient-innovation-to-21st-century, posted Apr. 17, 2013, 3 pages.

Ruddock, David. "Samsung Unleashes Galaxy S Phone Accessories: Desktop, Car Docks, and Spare Battery Charger; Teases WMG160 HD Media Streaming Device for the US," Galaxy S News, http://www.androidpolice.com/2010/08/11/samsung-unleashes-galaxy-s-phone-accessories-desktop-car-docks-and-spare-battery-charger-teases-wmg160-hd-media-streaming-device-for-the-us/, Aug. 11, 2010, 5 pages.

Chang, Jon M. "Starbucks Rolling Out Wireless Charging Stations," ABC News, http://abcnews.go.com/Technology/starbucks-rolling-wireless-charging-stations/story?id=19815480, Jul. 30, 2013, 2 pages.

Sharma, Aseem Gaurav. "The Tylt Vu Inductive Charger Debuts on Apr. 1 for $70," iPadfanzz, http://ipadfanzz.blogspot.com/, Jan. 20, 2013, 2 pages.

* cited by examiner

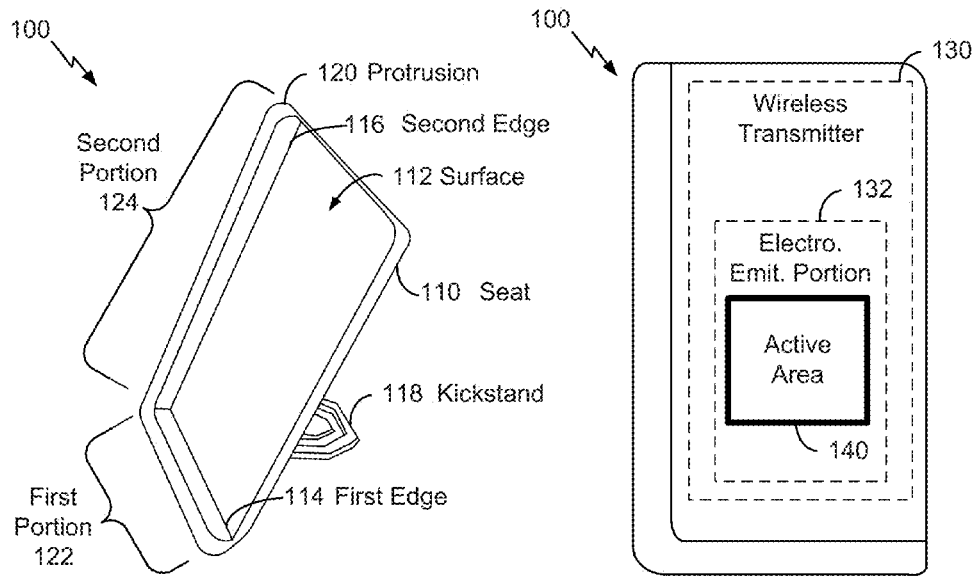
FIG. 1A     FIG. 1B
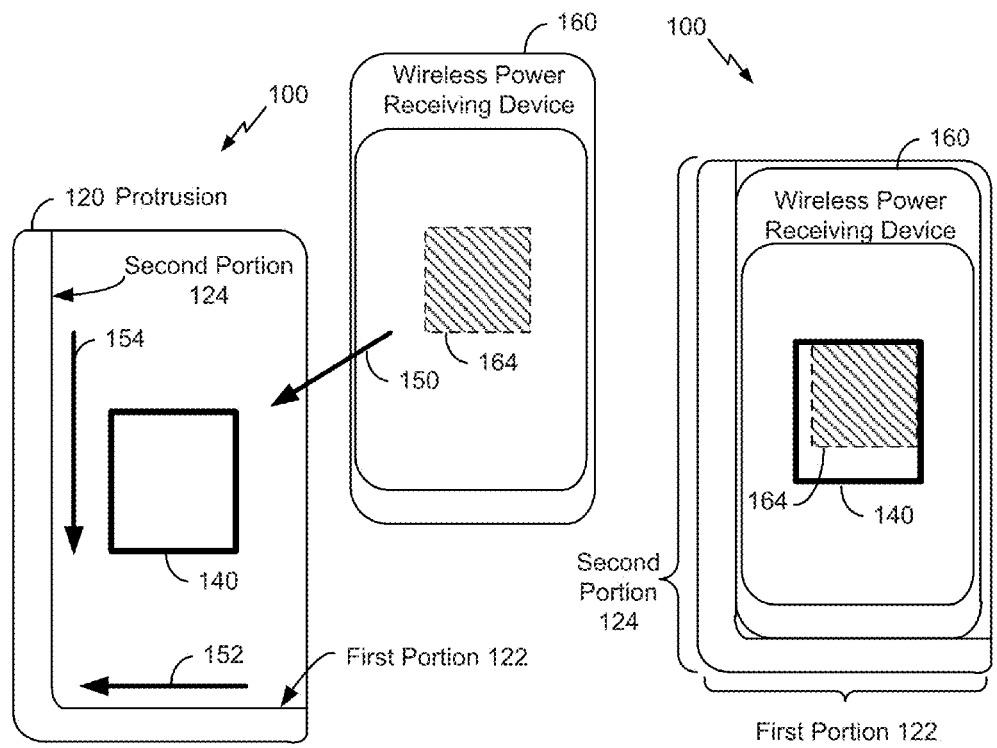
FIG. 1C     FIG. 1D

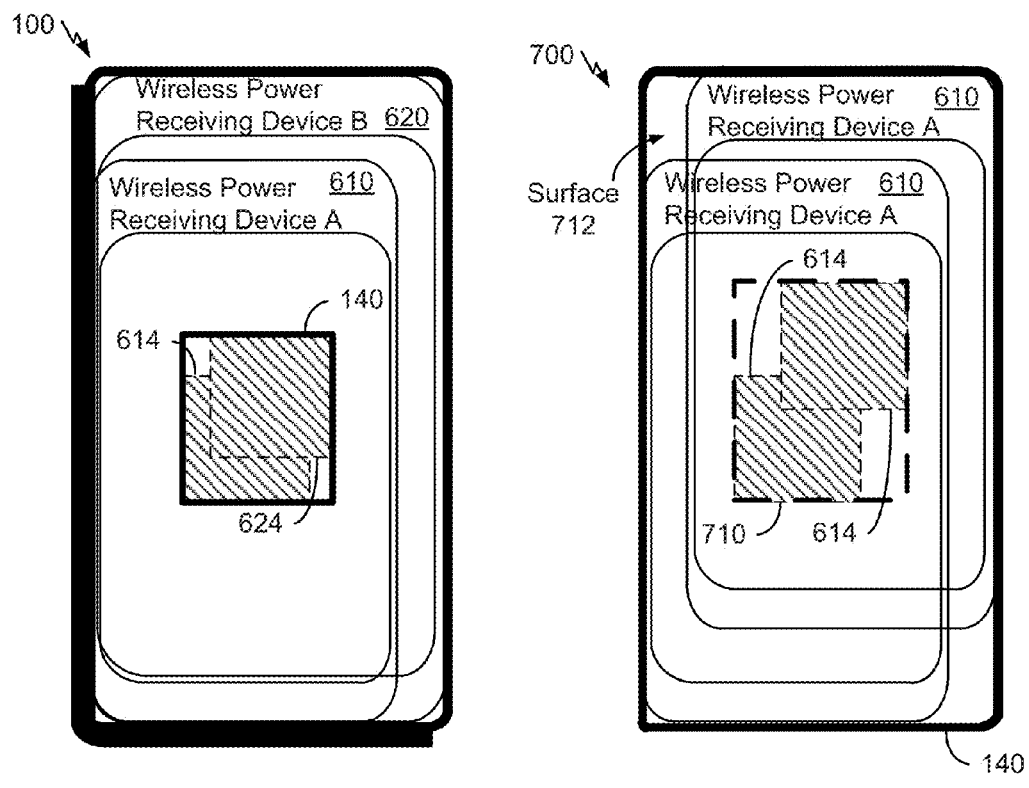
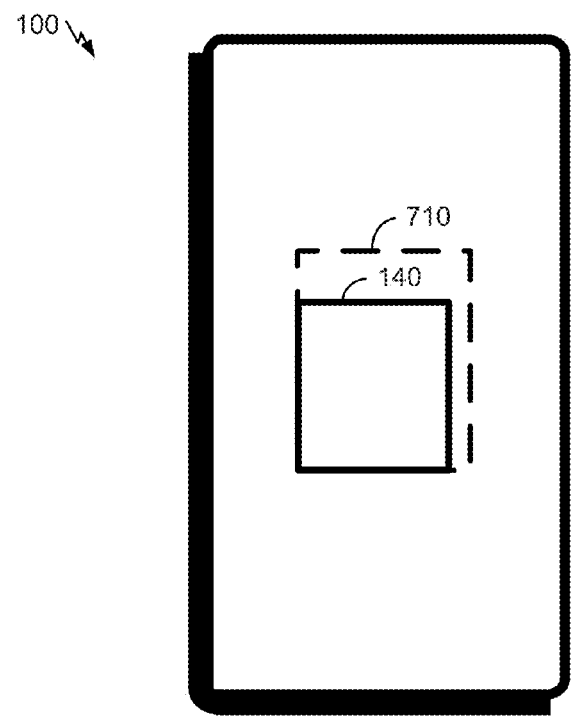
*FIG. 7*

WIRELESS POWER TRANSMITTING DEVICE

CROSS-REFERENCE TO RELATED APPLICATIONS

The present application claims priority to U.S. Provisional Application No. 61/863,081, filed Aug. 7, 2013, which application is hereby incorporated by reference herein in its entirety.

FIELD OF THE DISCLOSURE

The present disclosure is generally related to wireless power transmitting devices.

BACKGROUND

Charging pads are used to wirelessly transfer power from a transmitter of the charging pad to a receiver of a receiving device, such as a mobile phone or tablet computer. To transfer power from a charging pad to the receiving device, the receiving device may be placed on the charging pad by a user. Typically, an area of the charging pad is designated for placement of the receiving device. If the user does not correctly place the receiving device on the charging pad (e.g., does not align the receiving device with the designated area), power may be transferred at low efficiency or not at all. To account for misplacement (e.g., misalignment) of the receiving device on the charging pad, the charging pad may be designed to have a charging area, such as an active area defined by an electromagnetic field produced by the transmitter, that is larger than an area of the receiver. To generate a larger charging area for improved tolerance for misplacement, charging pads typically have one or three coils. As the number of inductive coils increases, so does a cost of producing each charging pad.

A charging pad may be configured to transfer power to different receiving device models of different receiving device types. As a variety of receiving device models and receiving device types increases, the charging area of the charging pad typically increases. Increasing the charging area requires additional components and complexity for the transmitter, which translates into increased costs for producing the charging pad.

SUMMARY

Wireless charging, such as inductive charging or magnetic resonance charging, uses an electromagnetic field to transfer energy between two objects, such as from a transmitter to a receiver. A wireless power transmitting device, such as a charging pad or power transfer station, may include a wireless transmitter that includes an electromagnetic emitting portion. An electromagnetic field produced by the electromagnetic emitting portion may define an active area. When a wireless receiver of a wireless power receiving device is placed at least partially in the active area, the wireless receiver and the wireless transmitter may be aligned to transfer power.

To facilitate alignment of the wireless receiver and the wireless transmitter, the wireless power transmitting device may include at least one protrusion coupled to a surface of the wireless power transmitting device. The surface may accommodate the wireless power receiving device and may also contain the active area corresponding to the electromagnetic emitting portion. The protrusion is configured as a guide for two sides of the wireless power receiving device to align the wireless receiver with the wireless transmitter. By guiding the wireless power receiving device so that the wireless receiver is aligned with the wireless transmitter, the wireless power transmitting device reduces an ability of a user to make a mistake when placing the wireless power receiving device on the wireless power transmitting device. Accordingly, the wireless transmitter does not need to be designed, e.g., sized or positioned, to account for placement mistakes caused by a user. The active area may be sized and positioned specifically for the wireless power receiving devices that the wireless power transmitting device is designed to accommodate. By sizing and positioning the active area specifically for particular wireless power receiving devices, a complexity and a cost of the wireless transmitter may be limited.

The wireless power transmitting device may be configured to charge at least one wireless power receiving devices, such as one or more different receiving device models of different receiving device types. The wireless power transmitting device may also be configured to be used in multiple orientations, such as a vertical orientation, a horizontal orientation, or a flat orientation. The wireless power transmitting device may also be configured to concurrently wirelessly transfer power to multiple wireless power receiving devices.

BRIEF DESCRIPTION OF THE DRAWINGS

FIGS. 1A-D are views of an illustrative embodiment of a wireless power transmitting device;

FIG. 7 is different views illustrating an active area of the wireless power transmitting device of FIG. 1A as compared to a wireless charging pad device without a protrusion to guide placement of wireless power receiving devices along two edges;

DETAILED DESCRIPTION

Figure 2:
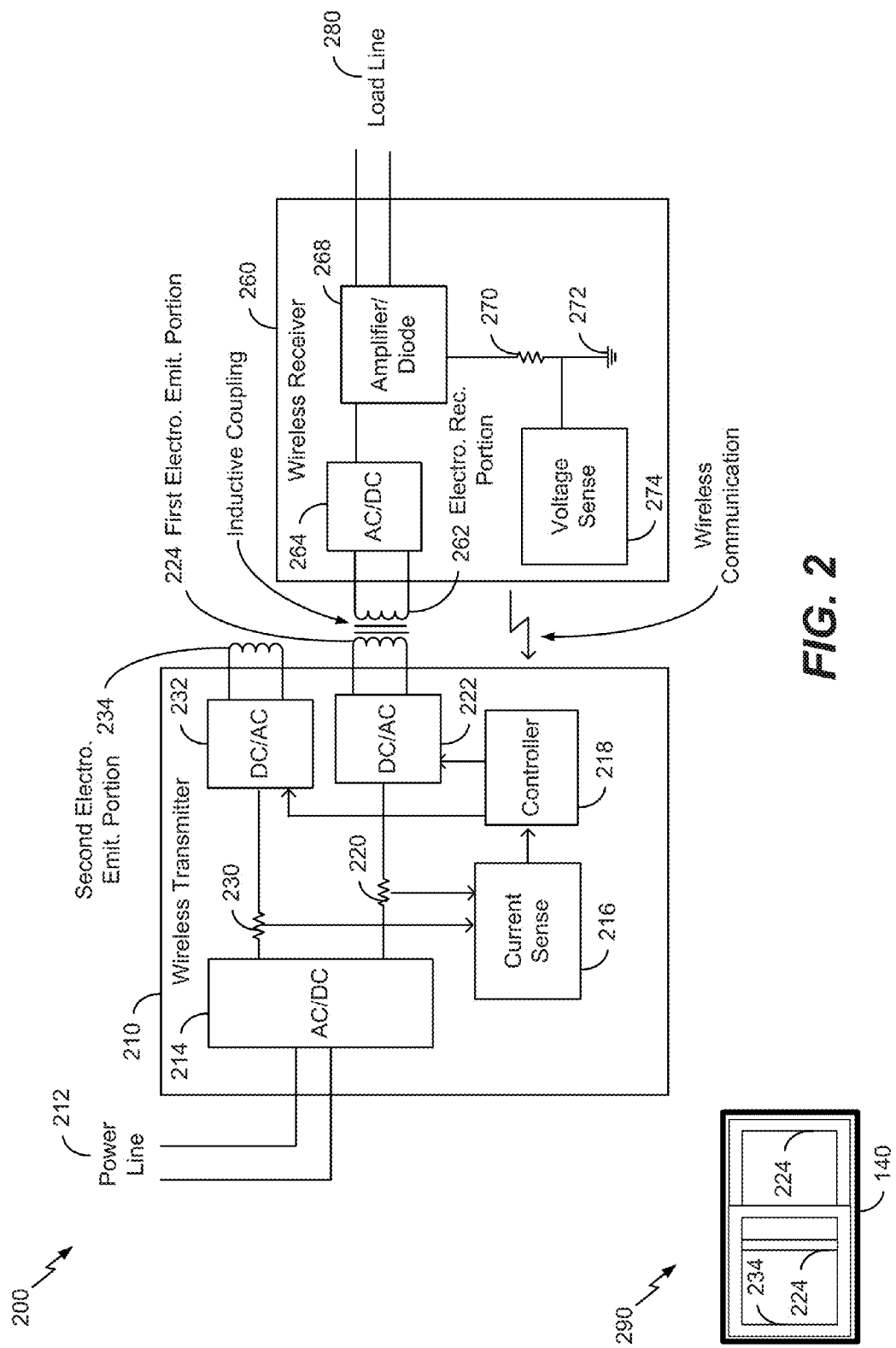
FIG. 2 is system for wirelessly transferring power.

Particular embodiments of the present disclosure are described below with reference to the drawings. In the description, common features are designated by common reference numbers throughout the drawings.

Referring to FIGS. 1A-D, multiple views of a wireless power transmitting device 100 are shown. The wireless power transmitting device 100 may be configured to wirelessly transfer power to at least one wireless power receiving device, such as a wireless power receiving device 160. The wireless power transmitting device 100 may also be configured to transfer power to different wireless power receiving device models of different receiving device types. For example, the wireless power receiving device 160 may include a mobile device, such as a mobile communication device or a tablet computer, a toothbrush, a game console controller, a global positioning system (GPS) device, a Bluetooth headset, another device configured to wirelessly receive power, or a combination thereof. As an illustrative example, the wireless power transmitting device 100 may be configured to wirelessly transfer power to a particular wireless power receiving device having a particular model of a particular device type. For example, a device type may include one or a mobile communication device, a tablet computer, a toothbrush, a video game console controller, or any other device type capable of receiving power wirelessly. For a particular device type, different models of devices having the particular device type may be produced by one or more manufacturers. The wireless power receiving device 160 may use the transferred power to charge a battery of the particular wireless power receiving device, to power one or more components or systems of the particular wireless power receiving device, or a combination thereof.

Referring to FIG. 1A, the wireless power transmitting device 100 includes a seat 110. The seat 110 includes a surface 112 and at least one protrusion, such as a protrusion 120, coupled to the surface 112. The seat 110 may accommodate at least one wireless power receiving device, such as the wireless power receiving device 160, as depicted in FIGS. 1C-D. As an illustrative example, the seat 110, the surface 112, or a combination thereof may have a substantially rectangular shape. Corners of the seat 110 need not be ninety degree corners, but rather, one or more of the corners of the seat 110 may be rounded, of varying angles, or of a free formed shape. The wireless power transmitting device 100 may optionally include a power cord that couples the wireless power transmitting device 100 to a power source.

The protrusion 120 may be configured as a guide for two sides of the wireless power receiving device 160 for placement of the wireless power receiving device 160 on the surface 112. For example, the protrusion 120 may passively guide the two sides of the wireless power receiving device 160 to be in contact with the protrusion 120. As a particular illustrative example, the protrusion 120 may be an L-shaped barrier sitting on the surface 112 of the seat 110 to accommodate at least one wireless power receiving device that is rectangular-shaped (or square-shaped). The protrusion 120 may also be configured to provide support for the wireless power receiving device 160 when the wireless power transmitting device 100 is in one of a vertical orientation or a horizontal orientation, as described further with reference to FIGS. 3A-C. For example, the protrusion 120 may be a barrier against which at least one wireless power receiving device, such as the wireless power receiving device 160 of FIG. 1C, is able to rest when placed on the seat.

The protrusion 120 may include a first portion 122 and a second portion 124. The protrusion 120 may form one or more barriers against which the wireless power receiving device 160 is able to rest (or be placed in contact with) when the wireless power receiving device 160 is placed on the surface 112 of the seat 110. For example, the first portion 122 (e.g., a first barrier) may be positioned proximate to a first edge 114 of the surface 112. The second portion 124 (e.g., a second barrier) may be positioned proximate to a second edge 116 of the surface 112. The first edge 114 of the surface 112 may be adjacent to the second edge 116 of the surface 112. As a particular illustrative example, the first portion 122 of the protrusion 120 is positioned at an angle of ninety degrees with respect to the second portion 124 of the protrusion 120. As another particular illustrative example, the first portion 122 of the protrusion 120 may be positioned at an angle other than ninety degrees with respect to the second portion 124 of the protrusion 120. For example, the first portion 122 of the protrusion 120 may be positioned at an angle of sixty degrees with respect to the second portion 124 of the protrusion 120 to accommodate a particular wireless power receiving device having a sixty degree angle between two sides of the particular wireless power receiving device. A length of the first portion 122 may be a same length or a different length than the second portion 124. The first portion 122, the second portion 124, or a combination thereof, may operate as a barrier against which the wireless power receiving device 160 is able to rest when placed on the seat 110, as described with reference to FIGS. 3A-C. For example, when the wireless power transmitting device 100 is in a vertical orientation, as depicted in FIG. 1A, the first portion 122 may be configured to impede the wireless power receiving device 160 from sliding off of the surface 112 via the first edge 114 of the surface 112. As another example, when the wireless power transmitting device 100 is in a horizontal orientation, the second portion 124 may be configured to impede the wireless power receiving device 160 placed on the surface 112 from sliding off of the surface 112 via the second edge 116 of the surface 112.

The wireless power transmitting device 100 may optionally include a kickstand 118. The kickstand 118 may support the wireless power transmitting device 100 in multiple different orientations. When the kickstand 118 is not extended from the seat 110, the wireless power transmitting device 100 may lie flat (have a flat orientation) on a resting surface, such as a table top. When the kickstand 118 is extended from the seat 110, the kickstand 118 may enable the wireless power transmitting device 100 to be supported in a vertical orientation or a horizontal orientation. Referring to FIG. 1A, the wireless power transmitting device 100 is depicted in the vertical orientation on the resting surface (not shown). The kickstand 118 may also enable an angle of inclination between the wireless power transmitting device 100 and the resting surface to be varied, as described further with reference to FIGS. 5A-C.

Referring to FIG. 1B, the wireless power transmitting device 100 includes a wireless transmitter 130 with an electromagnetic emitting portion 132, such as one or more coils. As a particular illustrative example, the electromagnetic emitting portion 132 includes only two coils, such as two inductive coils. The wireless transmitter 130 may be included within the seat 110, as described further with reference to FIG. 12. For example, the seat 110 may contain the electromagnetic emitting portion 132 that generates an electromagnetic field. The electromagnetic field produced by the electromagnetic emitting portion 132 may define an active area 140. The electromagnetic emitting portion 132 may be positioned within the wireless power transmitting device 100 (e.g., within the seat 110) to define the active area 140 at a desired location on the surface 112. The active area 140 associated with the electromagnetic field may enable power transfer from the wireless power transmitting device 100 to the wireless power receiving device 160. The active area 140 may be associated with a sub-area of the surface 112 of the wireless power transmitting device 100, as indicated in FIG. 1B. The active area 140 may have a shape, such as a circle, an ellipse, a triangle, a rectangle (e.g., a square), or another shape. When a wireless receiver of the wireless power receiving device 160 is placed in the active area 140, the wireless receiver and the wireless transmitter 130 may be aligned to transfer power. The active area 140 may be configured to enable power transfer to the wireless power receiving device 160 even with only proximately aligned placement thereof over the active area 140.

Referring to FIG. 1C, the wireless power transmitting device 100 and the wireless power receiving device 160 are shown. The wireless power transmitting device 100 may facilitate alignment of the wireless power receiving device 160 into a power transfer position by passively guiding a user of wireless power transmitting device 100 during placement of the wireless power receiving device 160 on the surface 112 in a direction 150 (e.g., a direction generally toward a corner of the surface 112 where the first portion 122 meets the second portion 124).

The wireless power receiving device 160 may include a wireless receiver (not shown) including an electromagnetic receiving portion associated with a reception area 164. The protrusion 120 may guide the wireless power receiving device 160 so that the reception area 164 of the wireless power receiving device 160 is aligned with the active area 140 of the wireless power transmitting device 100. For example, the protrusion 120 may be configured as a guide for two sides of the wireless power receiving device 160 for placement, over the active area 140, of the wireless power receiving device 160. Placement of the wireless power receiving device 160 over the active area 140 may enable charging of the wireless power receiving device 160. For example, the protrusion 120 may be configured as a guide for placement of the reception area 164 into alignment with the active area 140 when two sides of the wireless power receiving device 160 are in contact with the protrusion 120. For example, the first portion 122 may act as a first barrier to limit movement of the wireless power receiving device 160 in a direction 154. Additionally, the second portion 124 may act as a second barrier to limit movement of the wireless power receiving device 160 in a direction 152. The first portion 122 (e.g., the first barrier) may be coupled to the second portion 124 (e.g., the second barrier) to form a continuous barrier, such as an L-shaped barrier, as depicted in FIGS. 1A-C.

Referring to FIG. 1D, the wireless power receiving device 160 may be placed on the seat 110. With the protrusion 120 acting as a guide for the wireless power receiving device 160, the reception area 164 may be positioned into alignment with the active area 140 when two sides of the wireless power receiving device 160 are in contact with the protrusion 120, such as when a first side of the wireless power receiving device 160 is in contact with the first portion 122 of the protrusion 120 and a second side of the wireless power receiving device 160 is in contact with the second portion 124 of the protrusion 120. As a particular illustrative example, the protrusion 120 may contact no more than two sides of the wireless power receiving device 160. When the reception area 164 is aligned with the active area 140, power may be wirelessly transferred from the wireless power transmitting device 100 to the wireless power receiving device 160, as described further with reference to FIG. 2.

The active area 140 may be positioned and sized to enable wireless transmission of power from the wireless transmitter 130 to at least one wireless power receiving device via a wireless receiver (associated with a reception area) of the at least one wireless power receiving device. Although the active area 140 is depicted in FIG. 1D as being larger than the reception area 164 of the wireless power receiving device 160, the active area 140 may be a same size as the reception area 164 or smaller than the reception area 164 of the wireless power receiving device 160.

During operation of the wireless power transmitting device 100, a user of the wireless power transmitting device 100 may place the wireless power receiving device 160 on the surface 112 of the seat 110. The surface 112 may receive and support the wireless power receiving device 160. The user may position the wireless power receiving device 160 so that the reception area 164 is aligned with the active area 140. The protrusion 120 may act as a guide to position the reception area 164 in alignment with the active area 140. When the at least two sides of the wireless power receiving device 160 are in contact with the protrusion 120, power may be wirelessly transferred from the wireless power transmitting device 100 to the wireless power receiving device 160 via the active area 140 and the reception area 164.

By providing the protrusion 120 (e.g., at least one protrusion) to operate as a guide for at least one wireless power receiving device, the wireless power transmitting device 100 may facilitate alignment of that a reception area of the at least one wireless power receiving device with the active area 140. Accordingly, a size and a placement of the active area 140 may be controlled, and hence reduce a cost of the wireless power transmitting device 100. For example, a number of coils may be reduced and/or a size of one or more coils may be reduced as compared to an implementation without the guiding protrusion 120. Additionally, when the wireless power receiving device 160 is placed on the seat 110 and two sides of the wireless power receiving device 160 are in contact with the protrusion 120, wireless power may be efficiently transferred from the wireless power transmitting device 100 to the wireless power receiving device 160 because the reception area 164 is aligned with the active area 140. The reduced cost may be realized by not designing the active area 140 to cover additional area of the surface 112 to wirelessly provide power to wireless power receiving devices that are not aligned to the edges 114, 116.

Referring to FIG. 2, a system 200 for wirelessly transferring power is shown. The system 200 may include a wireless transmitter 210 and a wireless receiver 260. The wireless transmitter 210 may correspond to the wireless transmitter 130 of the wireless power transmitting device 100 of FIG. 1. The wireless receiver 260 may correspond to a wireless power receiving included in the wireless power receiving device 160 of FIG. 1C. The wireless transmitter transfer power 210 may transfer power to the wireless receiver 260 by induction or magnetic resonance.

The wireless transmitter 210 may include an AC/DC converter 214, resistors 220, 230, DC/AC converters 222, 232, electromagnetic emitting portions 224, 234 (e.g., electromagnetic coils), a current sense circuit 216, and a controller 218.

The AC/DC converter 214 may receive power from an alternating current power source via a power line 212. The AC/DC converter 214 may convert the alternating current power to direct current power. The direct current power may be provided to each of the DC/AC converters 222, 232 via respective resistors 220, 230. Each of the DC/AC converters 222, 232 may be coupled to a corresponding electromagnetic emitting portion, such as an electromagnetic coil, of the wireless transmitter 210. For example, a first DC/AC converter 222 may receive direct current power via a first resistor 220 and may be coupled to a first electromagnetic emitting portion 224. As another example, a second DC/AC converter 232 may receive direct current power via a second resistor 230 and may be coupled to a second electromagnetic emitting portion 234. Although the wireless transmitter 210 is depicted as including two electromagnetic emitting portions 224, 234, in other implementations the wireless transmitter 210 may include fewer than or more than two electromagnetic emitting portions 224, 234. In other implementations, the wireless transmitter includes only two electromagnetic emitting portions, e.g., only two electromagnetic coils. A combined electromagnetic field that may be produced by the first electromagnetic emitting portion 224 and the second electromagnetic emitting portion 234 may define an active area, such as the active area 140, of the wireless power transmitting device that includes the wireless transmitter 210. For example, referring to the electromagnetic emitting portion 290, the first electromagnetic emitting portion 224 and the second electromagnetic emitting portion 234 are depicted as two overlapping coils that define the active area 140 of FIG. 1.

The controller 218 may be configured to selectively activate each of the DC/AC converters 222, 232. For example, the controller 218 may periodically activate either of the first electromagnetic emitting portion 224, the second electromagnetic emitting portion 234, or a combination thereof, to determine if a particular electromagnetic emitting portion is inductively coupled to an electromagnetic receiving portion, such as an electromagnetic coil. Although FIG. 2 depicts wireless power transfer using induction, the wireless transmitter 210 may alternatively wirelessly transfer power to the receiving device 260 using magnetic resonance. Alternatively or additionally, the controller 218 may selectively activate the DC/AC converters 222, 232 based on a wireless communication signal received from a wireless power receiving device located proximate to the wireless transmitter 210. The controller 218 may determine whether either of the electromagnetic emitting portions 224, 234 is inductively coupled based on the current sense circuit 216. For example, either one of the electromagnetic emitting portions 224, 234 may be inductively coupled to an electromagnetic receiving portion, such as an electromagnetic receiving portion 262. When a particular electromagnetic emitting portion is in proximity with a particular electromagnetic receiving portion so as to be inductively coupled, the pair of electromagnetic devices may form an electrical transformer.

The current sense circuit 216 may monitor an amount of current traveling through each of the resistors 220, 230. When the controller 218 selectively activates the DC/AC converters 222, 232, current may flow through one of, both, or none of the resistors 220, 230 based whether or not the first electromagnetic emitting portion 224 or the second electromagnetic emitting portion 234 is inductively coupled to an electromagnetic receiving portion of a wireless receiver, such as the electromagnetic receiving portion 262 of the wireless receiver 260. The current sense circuit 216 may provide an indication to the controller 218 whether current is traveling through one or more of the resistors 220, 230. For example, when the controller 218 activates the DC/AC converter 222, current through the resistor 220 (as detected by the current sense circuit 216) may indicate that the first electromagnetic emitting portion 224 is inductively coupled to the wireless receiver 260.

Based on the amount of current through each of the resistors 220, 230, respectively, the controller 218 may determine that one of, both of, or none of the first electromagnetic emitting portion 224 and the second electromagnetic emitting portion 234 is inductively coupled to the wireless receiver 260. For example, the controller 218 may compare a first amount of current through the first resistor 220 to a threshold to determine whether the first electromagnetic emitting portion 224 is inductively coupled to the wireless receiver 260. When the first amount of current does not satisfy the threshold (e.g., the current is less than the threshold), the controller 218 may selectively deactivate the first DC/AC converter 222. When the first amount of current satisfies the threshold (e.g., the current is greater than or equal to the threshold), the controller 218 may keep the first DC/AC converter 222 activated because the first electromagnetic emitting portion 224 is inductively coupled to the wireless receiver 260. The controller 218 may selectively enable or disable the second DC/AC converter 232 based on a comparison of a second amount of current through the second resistor 230 to the threshold.

When the controller 218 maintains one or more of the DC/AC converters 222, 232 in an activated state, the controller 218 may activate an indicator, such as a light emitting diode (LED), that indicates that one of the electromagnetic emitting portions 224, 234 is inductively coupled (and that power is being wireless transferred from one of the electromagnetic emitting portions 224, 234) to an electromagnetic receiving portion 262 of the wireless receiver 260. Additionally or alternatively, when the controller 218 maintains one or more of the DC/AC converters 222, 232 in the activated state, the current sense circuit 216 may continue to monitor the amount of current through one or more of the resistors 220, 230 and provide an indication of the monitored current to the controller 218. The controller 218 may maintain the one or more DC/AC converters 222, 232 in the activated state as long as an amount of current corresponding to a particular DC/AC converter 222, 232 satisfies the threshold.

The wireless receiver 260 may include an AC/DC converter 264, an amplifier/diode 268, a resistor 270, a ground 272 and a voltage sense circuit 274. The AC/DC converter 264 may be coupled to an electromagnetic receiving portion 262. The electromagnetic receiving portion 262 may be inductively coupled with one or more of the electromagnetic emitting portions 224, 234 of the wireless transmitter 210. When the electromagnetic receiving portion 262 is inductively coupled with one or more of the electromagnetic emitting portions 224, 234, such as the first electromagnetic emitting portion 224, the electromagnetic receiving portion 262 may provide alternating current power to the AC/DC converter 264.

The AC/DC converter 264 may convert power received from the electromagnetic receiving portion 262 into direct current power that the AC/DC converter 264 provides to the amplifier/diode 268. The amplifier/diode 268 may condition the direct current power and may provide the conditioned direct current power, via a load line 280, to the wireless power receiving device that includes the wireless receiver 260. For example, the load line 280 may be coupled to a battery charging circuit, to one or more processing circuits, to other electrical components within or coupled to the wireless power receiving device, or a combination thereof.

A portion of the direct current power provided by the AC/DC converter 264 may be provided to the ground 272 via the resistor 270 via the amplifier/diode 268. The direct current power provided to the ground 272 via the resistor 270 may enable the voltage sense circuit 274 to determine whether the electromagnetic receiving portion 262 is inductively coupled to and wirelessly receiving power from the wireless transmitter 210. When the voltage sense circuit 274 determines that the electromagnetic receiving portion 262 is inductively coupled and wirelessly receiving power, the voltage sense circuit 274 may initiate an indication that the wireless receiver 260 is wirelessly receiving power. For example, based on the voltage sense circuit 274, a controller (not shown) of the wireless power receiving device that includes the wireless receiver 260, may activate an indicator, such as a light emitting diode (LED), that indicates that the wireless receiver 260 is wirelessly receiving power. Alternatively or additionally, the controller associated with the wireless receiver 260 may communicate a signal to the wireless transmitter 210 indicating that the wireless receiver 260 is wirelessly receiving power. For example, when the wireless transmitter 210 is wirelessly transferring power to the wireless receiver 260, communication between the wireless transmitter 210 and the wireless receiver 260 may utilize the induction coupling. As another example, when the wireless transmitter 210 is wirelessly transferring power to the wireless receiver 260 (e.g., is an implementation using magnetic resonance), communication between the wireless transmitter 210 and the wireless receiver 260 may utilize a separate communication, such as Bluetooth.

During operation of the system 200, the controller 218 may selectively enable the DC/AC converters 222, 232. The controller 218 may determine whether the electromagnetic emitting portions 224, 234 are inductively coupled to the electromagnetic receiving portion 262 associated with a wireless power receiving device. In response to a determination that a particular electromagnetic emitting portion of the electromagnetic emitting portions 224, 234 is inductively coupled to the electromagnetic receiving portion 262, the controller 218 may maintain, in an enabled state, a particular DC/AC converter corresponding to the particular electromagnetic emitting portion that is inductively coupled to the electromagnetic receiving portion 262. Accordingly, power may be wirelessly transferred from the wireless transmitter 210 to the wireless receiver 260 via the particular electromagnetic emitting portion and the electromagnetic receiving portion 262.

Figure 3A:
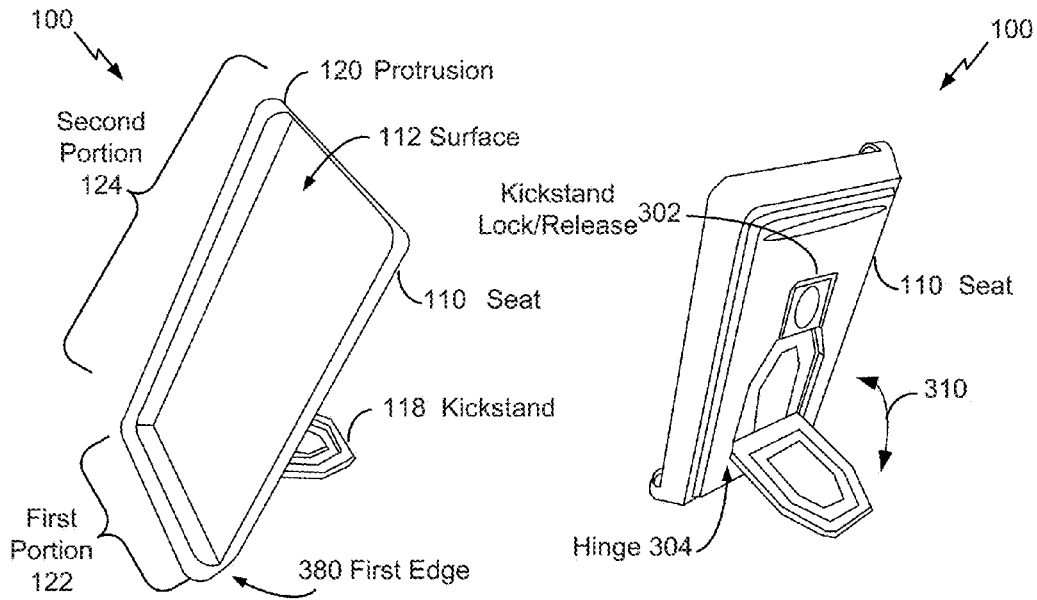
FIGS. 3A-C are views of an illustrative embodiment of the wireless power transmitting device of FIG. 1A illustrating different possible orientations of the wireless power transmitting device of FIG. 1A.
Figure 3B:
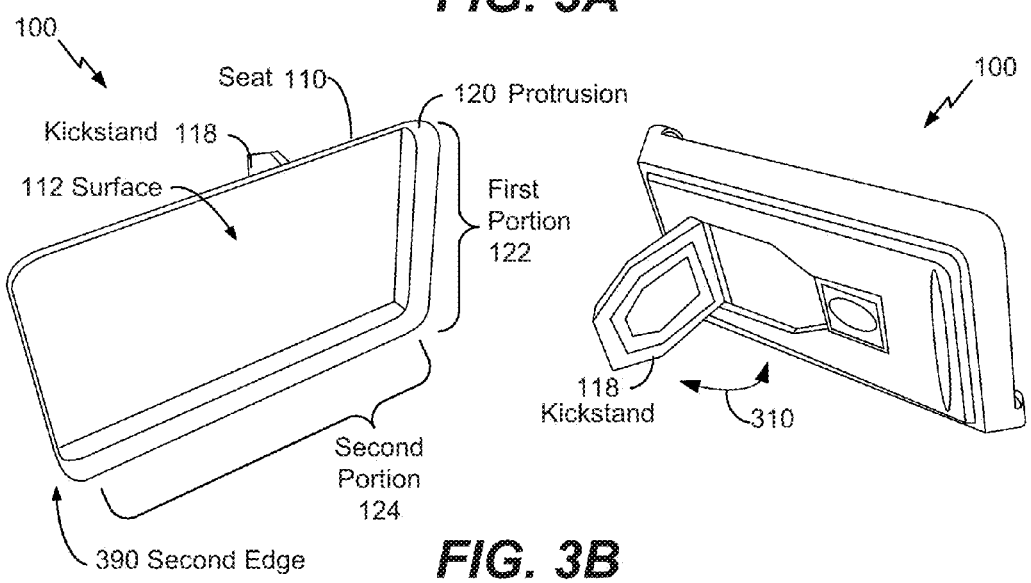
Figure 3C:
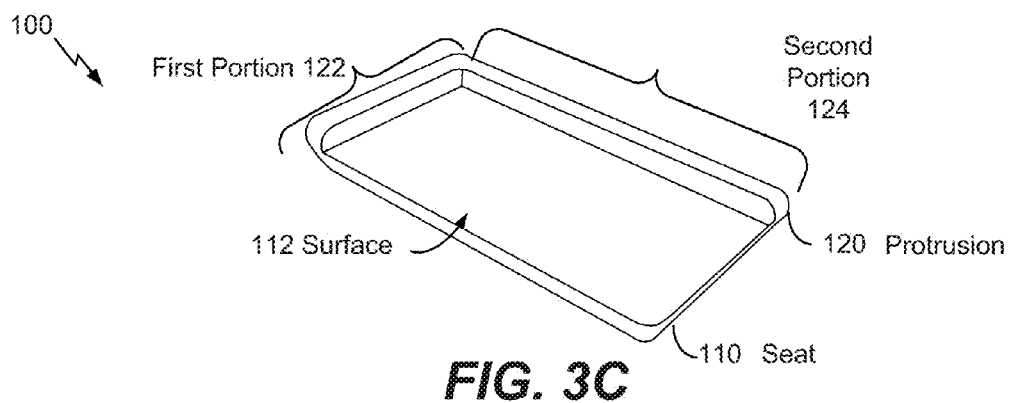

FIGS. 3A-C illustrate different possible orientations of the wireless power transmitting device 100 with respect to a resting surface on which the wireless power transmitting device 100 is placed. For example, the wireless power transmitting device 100 may be placed in a vertical orientation, a horizontal orientation, or a flat orientation on the resting surface.

Referring to FIG. 3A, a front perspective view and a rear perspective view of a vertical orientation of the wireless power transmitting device 100 with respect to the resting surface are shown. The wireless power transmitting device 100 may include a kickstand lock/release 302. The kickstand lock/release 302 may be configured to secure the kickstand 118 in an extended position, to secure the kickstand 118 in a folded position (e.g., in a recess in the back of the wireless power transmitting device 100), or both. The kickstand lock/release 302 may be operated to release the kickstand 118 from a secure position and to enable the kickstand 118 to pivot about a hinge 304 that couples the kickstand 118 to the seat 110. The kickstand 118 may pivot about the hinge 304 in according to a path of motion 310.

The wireless power transmitting device 100 in the vertical orientation may be configured to receive a wireless power receiving device, such as the wireless power receiving device 160 of FIG. 1C. For example, the wireless power receiving device may be placed on the seat 110 so that a first side of the wireless power receiving device rests on or is supported by the first portion 122 of the protrusion 120. The wireless power receiving device may be positioned on the seat 110 so that a second side of the wireless power receiving device is touching the second portion 124 of the protrusion 120. When the first side of the wireless power receiving device is supported by the first portion 122 and the second side of the wireless power receiving device is in contact with the second portion 124, a reception area of the wireless power receiving device may be aligned with the active area of the wireless power transmitting device 100. Accordingly, when the wireless power transmitting device 100 is in the vertical orientation, the protrusion 120 (e.g., at least one protrusion) may be configured to guide the wireless power receiving device so that reception area of the wireless power receiving device is aligned with the active area 140.

As an illustrative example, the vertical orientation may include an angle of the wireless power transmitting device 100 with respect to a resting surface and is used to distinguish an orientation of the wireless power transmitting device 100 in which a short side of the seat 110 is in contact with the resting surface and a long side of the seat 110 projects away from the resting area. Accordingly, the surface 112 and the first portion 122 may be configured to support at least one wireless power receiving device, such as the wireless power receiving device 160 of FIG. 1C, in a vertical orientation when the seat 110 is in contact with a resting surface (e.g., a table top) along a first edge 380 of the seat 110.

Referring to FIG. 3B, a front perspective view and a rear perspective view of a horizontal orientation of the wireless power transmitting device 100 with respect to the resting surface are shown. The kickstand 118 may be in an extended position to support the wireless power transmitting device 100 in the horizontal orientation.

The wireless power transmitting device 100 in the horizontal orientation may be configured to receive the wireless power receiving device. For example, the wireless power receiving device may be placed on the seat 110 so that the second side of the wireless power receiving device rests on or is supported by the second portion 124 of the protrusion 120. The wireless power receiving device may be positioned on the seat 110 so that the first side of the wireless power receiving device is touching the first portion 122 of the protrusion 120. When the first side of the wireless power receiving device is supported by the second portion 124 and the first side of the wireless power receiving device is in contact with the first portion 122, the reception area of the wireless power receiving device may be aligned with the active area of the wireless power transmitting device 100. Accordingly, when the wireless power transmitting device 100 is in the horizontal orientation, the protrusion 120 (e.g., at least one protrusion) may be configured to guide the wireless power receiving device so that the reception area of the wireless power receiving device is aligned with the active area 140.

As an illustrative example, the horizontal orientation may include an angle of the wireless power transmitting device 100 with respect to a resting surface and is used to distinguish an orientation of the wireless power transmitting device 100 in which a long side of the seat 110 is in contact with the resting surface and a short side of the seat 110 projects away from the resting area. Accordingly, the surface 112 and the second portion 124 may be configured to support at least one wireless power receiving device, such as the wireless power receiving device 160 of FIG. 1C, in a horizontal orientation when the seat 110 is in contact with a resting surface (e.g., a table top) along a second edge 390 of the seat 110.

Referring to FIG. 3C, a perspective view of the of the wireless power transmitting device 100 in a flat orientation (e.g., lying down) with respect to the resting surface is shown. In the flat orientation, the kickstand 118 may be positioned next to the seat 110 (e.g., in the recess illustrated in FIGS. 3A-B). For example, referring to FIGS. 3A-B, the kickstand 118 may be rotated about the hinge 304 along the path of motion 310 towards the seat 110. The kickstand 118 may engage the kickstand lock/release 302 to be secured next to the seat 110.

The wireless power transmitting device 100 in the flat orientation may be configured to receive a wireless power receiving device. For example, the wireless power receiving device may be placed on the seat 110 so that the first side of the wireless power receiving device is touching the first portion 122, and the second side of the wireless power receiving device is touching the second portion 124. When the first side of the wireless power receiving device is in contact with the first portion 122 and the second side of the wireless power receiving device is in contact with the second portion 124, a reception area of the wireless power receiving device may be aligned with the active area 140 of the wireless power transmitting device 100. Accordingly, when the wireless power transmitting device 100 is in the flat orientation, the protrusion 120 (e.g., at least one protrusion) may be configured to guide the wireless power receiving device so that the reception area of the wireless power receiving device is aligned with the active area of the wireless power transmitting device 100. As an illustrative example, the flat orientation may include a long edge (associated with the long side) and a short edge (associate with a short side) of the seat 110 being substantially coplanar or substantially parallel with respect to the resting surface.

Figure 4:
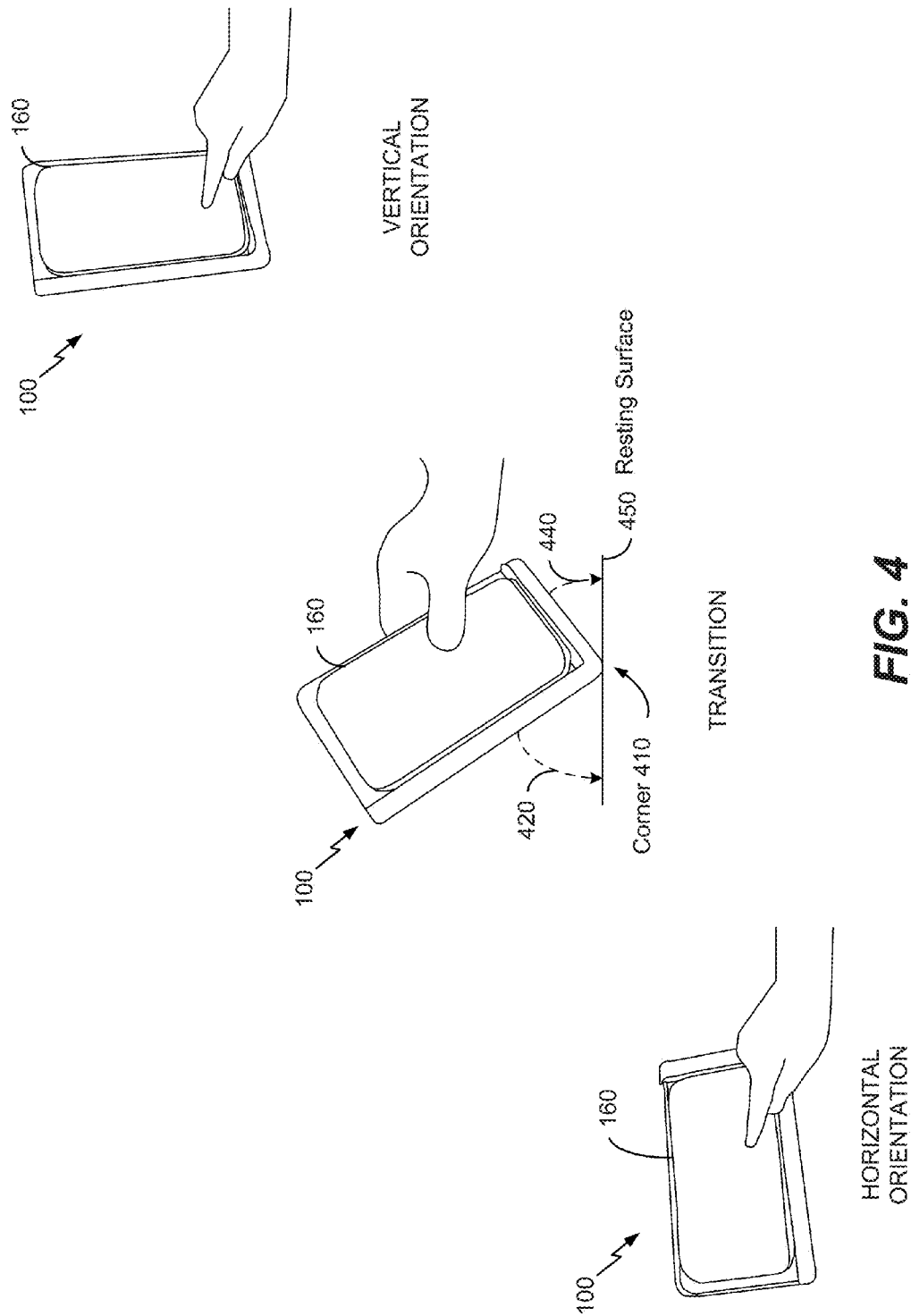
FIG. 4 is a diagram of an illustrative embodiment illustrating the wireless power transmitting device of FIG. 1A transitioning between a vertical orientation and a horizontal orientation.

FIG. 4 illustrates an illustrative example of transitioning the wireless power transmitting device 100 between two different possible orientations of the wireless power transmitting device 100 with respect to a resting surface 450 on which the wireless power transmitting device 100 is placed. For example, the wireless power transmitting device 100 may be transitioned between the vertical orientation and the horizontal orientation, that are illustrated in FIGS. 3A-B. A wireless power receiving device, such as the wireless power receiving device 160 of FIGS. 1C-D, may be positioned on the wireless power transmitting device 100. For example, the wireless power receiving device may be placed on a surface of the wireless power transmitting device 100 such that the wireless power receiving device is in contact with one or more protrusions, such as the protrusion 120 of FIGS. 1C-D, of the wireless power transmitting device 100.

Transitioning the wireless power transmitting device 100 between the vertical orientation and the horizontal orientation may include rotating the wireless power transmitting device 100. For example, the wireless power transmitting device 100 may be rotated by pivoting the wireless power transmitting device 100 about a corner 410 of the wireless power transmitting device 100. The corner 410 may be associated with at least one protrusion, such as the protrusion 120 of FIG. 1A. For example, the corner 410 may be associated with a portion of the seat 110 where the first portion 122 of the protrusion 120 and the second portion 124 of the protrusion 120 join.

To transition the wireless power transmitting device 100 from the vertical orientation to the horizontal orientation, the wireless power transmitting device 100 may be rotated in a direction 420. For example, the wireless power transmitting device 100 may be rotated from the vertical orientation to the horizontal orientation by pivoting the wireless power transmitting device 100 about the corner 410. To transition the wireless power transmitting device 100 from the horizontal orientation to the vertical orientation, the wireless power transmitting device 100 may be rotated in a direction 440. For example, the wireless power transmitting device 100 may be rotated from the horizontal orientation to the vertical orientation by pivoting the wireless power transmitting device 100 about the corner 410.

Figure 5A:
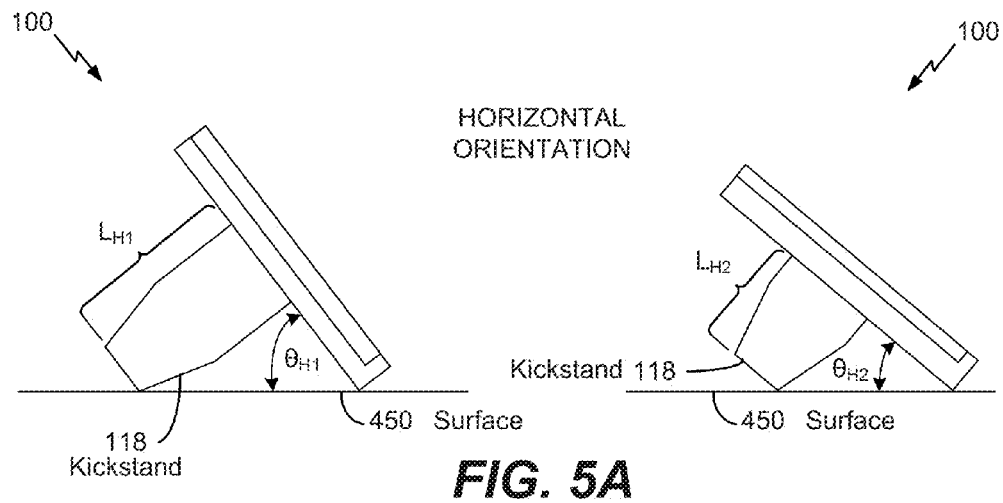
FIGS. 5A-C are views of an illustrative embodiment of the wireless power transmitting device of FIG. 1A having a kickstand.
Figure 5B:
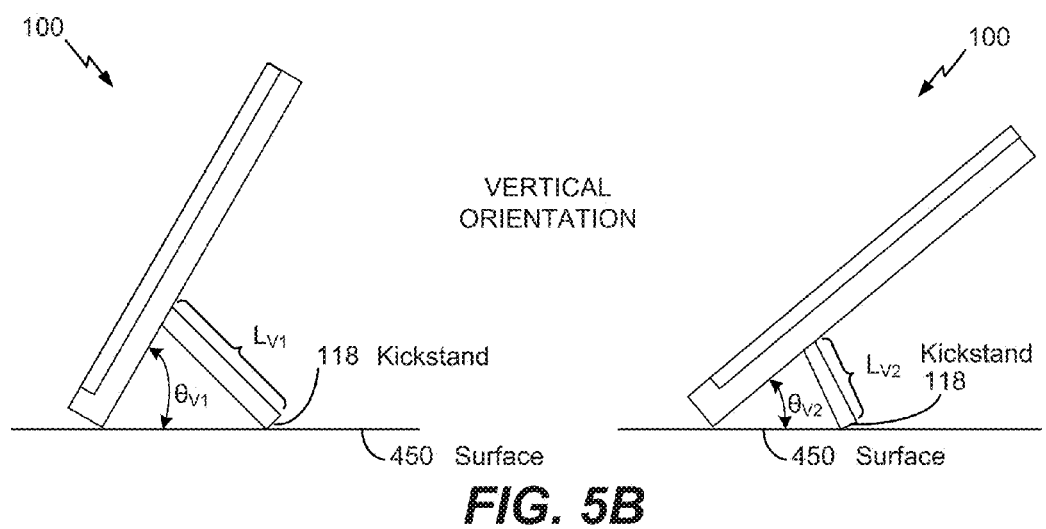
Figure 5C:
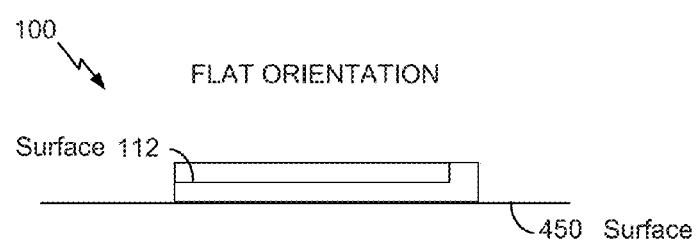

Referring to FIGS. 5A-C, illustrative examples of how an angle of orientation (e.g., a tilt) of the wireless power transmitting device 100 with respect to the resting surface 450 may be varied when the kickstand 118 includes an adjustable length. For example, a length of the kickstand 118 may be adjusted by a user of the wireless power transmitting device 100. For example, an angle of orientation between the wireless power transmitting device 100 and the resting surface 450 may be adjusted without interrupting transfer of power to the at least one wireless power receiving device during adjustment of the angle. For example, during an adjustment of the angle of orientation, the power may be transferred at a same rate of transfer or at a different rate of transfer from the wireless power transmitting device 100 to a particular wireless power receiving device as compared to a particular rate of transfer prior to the adjustment.

Referring to FIG. 5A, two illustrative examples of the wireless power transmitting device 100 in a horizontal orientation positioned on the resting surface 450 are depicted to illustrate how the angle of orientation may be varied. In a first example (depicted on the left), the kickstand 118 of the wireless power transmitting device 100 is extended to a first length $L_{H1}$. Based on the kickstand 118 having the first length $L_{H1}$, the wireless power transmitting device 100 may have a first angle of inclination $\theta_{H1}$. In a second example (depicted on the right), the kickstand 118 of the wireless power transmitting device 100 is extended to a second length $L_{H2}$. Based on the kickstand 118 having the second length $L_{H2}$, the wireless power transmitting device 100 may have a second angle of inclination $\theta_{H2}$. As illustrated in FIG. 5A, the first length $L_{H1}$ is longer than the second length $L_{H2}$ and, thus, the first angle of inclination $\theta_{H1}$ is larger than the second angle of inclination $\theta_{H2}$.

Referring to FIG. 5B, two illustrative examples of the wireless power transmitting device 100 positioned in a vertical orientation on the resting surface 450 are depicted to illustrate how the angle of orientation may be varied. In a third example (depicted on the left), the kickstand 118 of the wireless power transmitting device 100 is extended to a first length $L_{V1}$. Based on the kickstand 118 having the first length $L_{V1}$, the wireless power transmitting device 100 may have a first angle of inclination $\theta_{V1}$. In a fourth example (depicted on the right), the kickstand 118 of the wireless power transmitting device 100 is extended to a second length $L_{V2}$. Based on the kickstand 118 having the second length $L_{V2}$, the wireless power transmitting device 100 may have a second angle of inclination $\theta_{V2}$. As illustrated in FIG. 5B, the first length $L_{V1}$ is longer than the second length $L_{V2}$ and, thus, the first angle of inclination $\theta_{V1}$ is larger than the second angle of inclination $\theta_{V2}$.

Referring to FIG. 5C, an illustrative example of the wireless power transmitting device 100 in a flat orientation is shown. In the flat orientation, the seat 110 of the wireless power transmitting device 100 is positioned on the resting surface 450 such that the surface 112 of the seat 110 is substantially parallel with the resting surface 450. Accordingly, an angle of inclination associated with the wireless power transmitting device 100 may be substantially zero. In a particular illustrative example, the seat 110, the kickstand 118, or a combination thereof, may be configured so that when the wireless power transmitting deice is lying flat on the resting surface 450, the surface 112 is at an angle of inclination with respect to the vertical orientation, the horizontal orientation, or a combination thereof.

Figure 6:
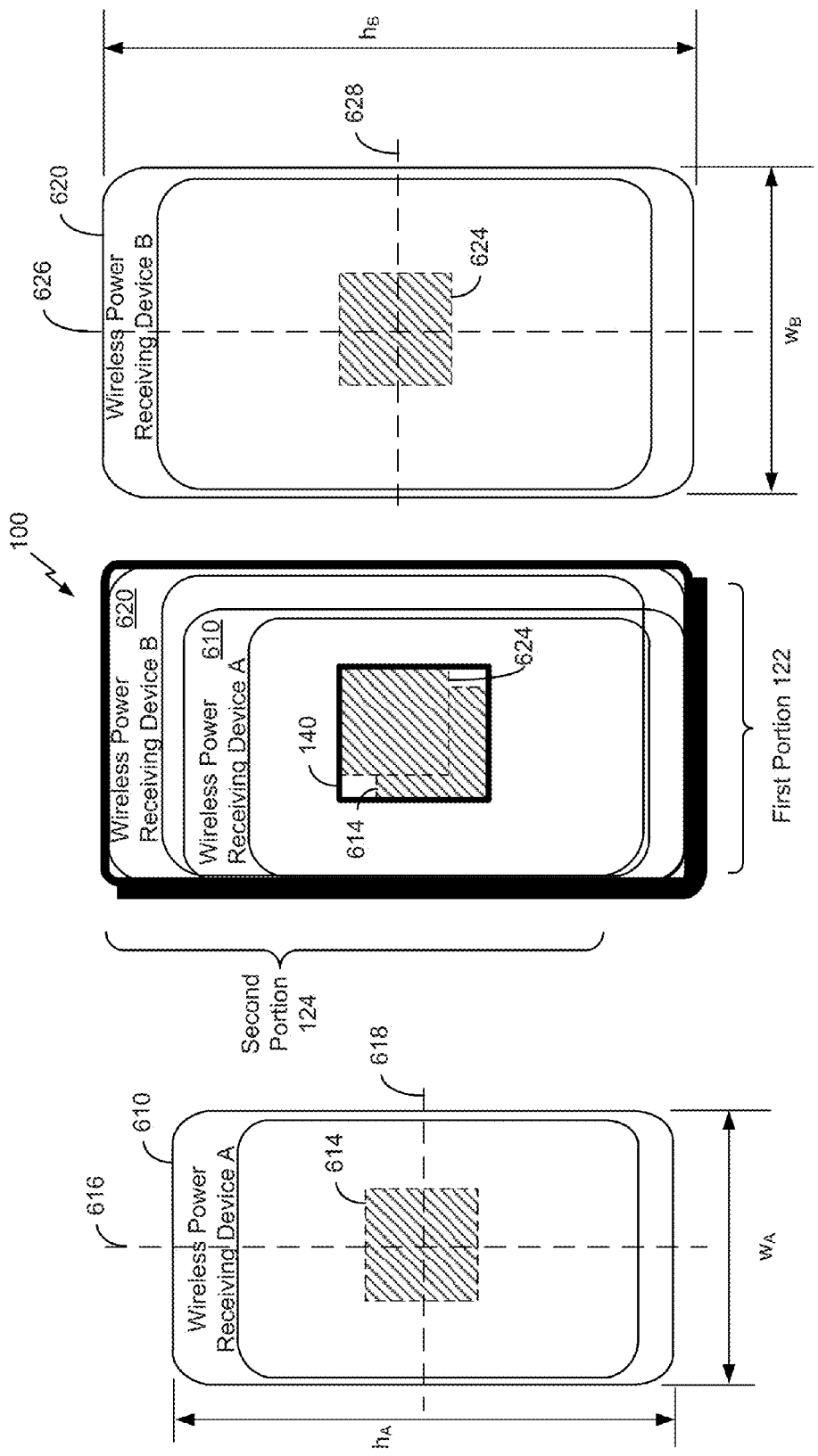
FIG. 6 is a diagram of an illustrative embodiment illustrating different wireless power receiving devices supported by the wireless power transmitting device of FIG. 1A.

Referring to FIG. 6, an illustrative embodiment is depicted illustrating different wireless power receiving devices supported by the wireless power transmitting device 100. For example, FIG. 6 depicts a first wireless power receiving device 610, a second wireless power receiving device 620, and the wireless power transmitting device 100 having the first wireless power receiving device 610 and the second wireless power receiving device 620 overlaid thereon. The first wireless power receiving device 610 and the second wireless power receiving device 620 may be different models of a same device type. Alternatively, the first wireless power receiving device 610 and the second wireless power receiving device 620 may be different device types The first wireless power receiving device 610 may correspond to a first model of a first device type. The first wireless power receiving device 610 may have a height of $h_A$ and a width of $w_A$. A first center line 616 may be positioned at a midpoint of the width $w_A$, and a second center line 618 may be positioned at a midpoint of the height $h_A$. The first wireless power receiving device 610 may include a first reception area 614 associated with an electromagnetic receiver of the first wireless power receiving device 610. A center of the first wireless power receiving device 610 may correspond to an intersection of the first center line 616 and the second center line 618 of the first wireless power receiving device 610. The first reception area 614 may be positioned at or near the center of the first wireless power receiving device 610. As another example, a center of the first reception area 614 may positioned along the first center line 616 at a location below the center of the first wireless power receiving device 610.

The second wireless power receiving device 620 may correspond to a second model of a second device type. The second wireless power receiving device 620 may have a height of $h_B$ and a width of $w_B$. A first center line 626 may be positioned at a midpoint of the width $w_B$, and a second center line 628 may be positioned at a midpoint of the height $h_B$. The second wireless power receiving device 620 may include a second reception area 624 associated with an electromagnetic receiver of the second wireless power receiving device 620. The center of the second wireless power receiving device 620 may correspond to an intersection of the first center line 626 and the second center line 628 of the second wireless power receiving device 620. The second reception area 624 may be positioned at or near a center of the second wireless power receiving device 620. As another example, a center of the second reception area 624 may be positioned along the first center line 626 at a location below the center of the first wireless power receiving device 610.

The wireless power transmitting device 100 is depicted with the first wireless power receiving device 610 and the second wireless power receiving device 620 overlaid on the wireless power transmitting device 100. The first wireless power receiving device 610 is overlaid on the first wireless power transmitting device 100 as if the first wireless power receiving device 610 were placed on the surface 112 of the seat 110 and guided by the protrusion 120. For example, the first wireless power receiving device 610 may be guided by the protrusion 120 such that a first side of the first wireless power receiving device 610 is touching the first portion 122 and a second side of the first wireless power receiving device 610 is touching the second portion 124. When the first wireless power receiving device 610 is guided into position by the protrusion 120, the first reception area 614 of the first wireless power receiving device 610 may be aligned with the active area 140 of the wireless power transmitting device 100 to enable wireless transmission of power from the wireless power transmitting device 100 to the first wireless power receiving device 610.

The second wireless power receiving device 620 is also overlaid on the wireless power transmitting device 100 as if the second wireless power receiving device 620 were placed on the surface 112 of the seat 110 and guided into position by the protrusion 120. For example, the second wireless power receiving device 620 may be guided by the protrusion 120 such that a first side of the second wireless power receiving device 620 is touching the first portion 122 and a second side of the second wireless power receiving device 620 is touching the second portion 124. When the second wireless power receiving device 620 is guided into position by the protrusion 120, the second reception area 624 of the second wireless power receiving device 620 may be aligned with the active area 140 of the wireless power transmitting device 100 to enable wireless transmission of power from the wireless power transmitting device 100 to the second wireless power receiving device 620.

The active area 140 may be sized to accommodate a range of wireless power receiving device sizes, such as a range of sizes of different wireless power receiving devices having different device types, different models of the same device type, or a combination thereof. Accordingly, the active area 140 may be designed to support multiple wireless power receiving device dimensions, such as multiple wireless power receiving devices that each have different physical dimensions. For example, the wireless power transmitting device 100 may be designed to produce a spatially continuous charging volume based on the range of wireless power receiving device sizes. The continuous charging volume may define the active area 140 of the wireless power transmitting device 100.

FIG. 7 illustrates the active area 140 of the wireless power transmitting device 100 of FIG. 1A as compared to a wireless charging pad device 700 without a protrusion to guide placement of wireless power receiving devices along two edges. Referring to a top left view of the wireless power transmitting device 100, the wireless power transmitting device 100 is reproduced as depicted in FIG. 6 for purposes of making the comparison.

Referring to the wireless charging pad device 700 without a protrusion to guide placement of wireless power receiving devices along two edges is depicted. A surface 712 of the wireless charging pad device 700 may be substantially the same size and shape as the surface 112 of the wireless power transmitting device 100. For the wireless charging pad device 700 to power a wireless power receiving device, such as the first wireless power receiving device 610 of FIG. 6, an entirety of the first wireless power receiving device 610 is set on the wireless charging pad device 700. Referring to the wireless charging pad device 700, the first wireless power receiving devices 610 has been overlaid on the wireless charging pad device 700 to illustrate a variety of locations that the first wireless power receiving device 610 may be placed on the wireless charging pad device 700. The wireless charging pad device 700 does not include any protrusions or barriers to aid a user in aligning a reception area 614 of the first wireless power receiving device 610 with an active area 740. It is noted that the active area 740 of the wireless charging pad device 700 is sized and positioned to accommodate the first wireless power receiving device 610 as long as the an entirety of the first wireless power receiving device 610 is positioned on the wireless charging pad device 700.

Referring to a top left view of the wireless power transmitting device 100, a comparison of the active area 140 for the wireless power transmitting device 100 to the active area 740 of the wireless charging pad device 700 is depicted. In the comparison, the active area 740 of the wireless charging pad device 700 has been overlaid on the wireless power transmitting device 100 along with the active area 140. As depicted in the comparison, the active area 140 of the wireless power transmitting device 100 is smaller than the active area 740 of the wireless charging pad device 700. Because the active area 140 is smaller than the active area 740, the wireless power transmitting device 100 may include fewer components, such as fewer electromagnetic coils, than the wireless charging pad device 700. Accordingly, a cost of producing the wireless power transmitting device 100 may be less than a cost of producing the wireless charging pad device 700.

Figure 8:
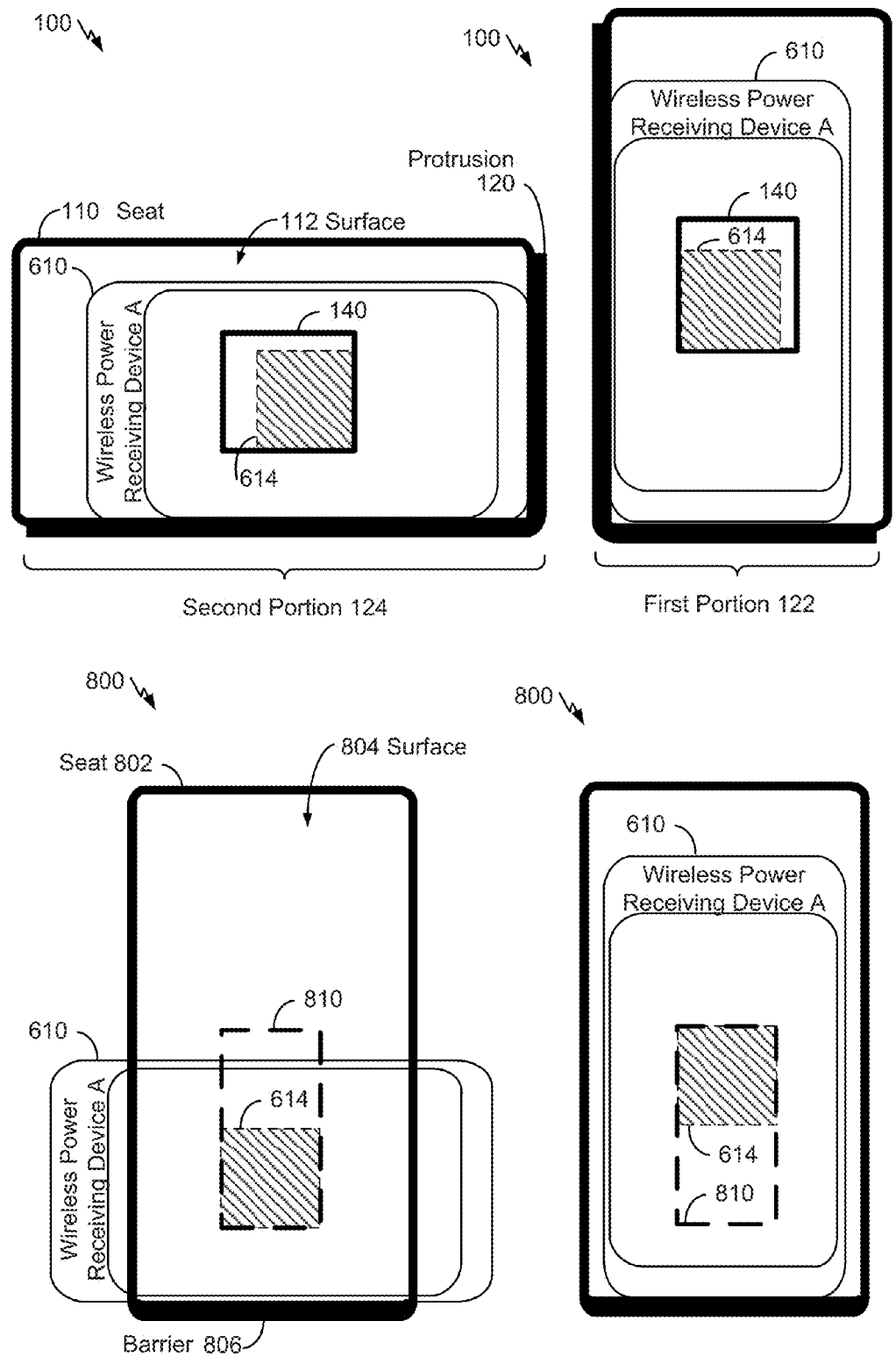
FIG. 8 are different views illustrating of an active area of the wireless power transmitting device of FIG. 1A as compared to a wireless power transmitting device without a protrusion to guide placement of wireless power receiving devices along two edges.

FIG. 8 illustrate the active area 140 of the wireless power transmitting device 100 of FIG. 1A as compared to a wireless power transmitting device 800, such as a charging pad, without a protrusion to guide placement of wireless power receiving devices along two edges. The wireless power transmitting device 800 may include an active area 810 and a single barrier 806.

The wireless power transmitting device 100 is depicted in a top left as supporting the first wireless power receiving device 610 of FIG. 6. In a horizontal orientation (i.e., a left view), the first wireless power receiving device 610 is placed on the surface 112 of the seat 110 and is in contact with the first portion 122 of the protrusion 120 and the second portion 124 of the protrusion 120. In the horizontal orientation, the first reception area 614 of the first wireless power receiving device 610 is aligned with the active area 140 of the wireless power transmitting device 100. In a vertical orientation (i.e., a right view), the first wireless power receiving device 610 is placed on the surface 112 of the seat 110 and is in contact with the first portion 122 and the second portion 124. In the vertical orientation, the first reception area 614 of the first wireless power receiving device 610 is aligned with the active area 140 of the wireless power transmitting device 100. In both the horizontal orientation and the vertical orientation, the first reception area 614 of the first wireless power receiving device 610 is aligned with a same portion of the active area 140. Accordingly, to accommodate the first wireless power receiving device 610, the wireless power transmitting device 100 may have an active area 140 that corresponds in size to the first reception area 614 of the first wireless power receiving device 610 in order for the first reception area 614 and the active area 140 to be aligned when the first wireless power receiving device 610 (and the wireless power transmitting device 100) is in the horizontal orientation and the vertical orientation.

The wireless power transmitting device 800 includes a seat 802 and the single barrier 806. A surface 804 of the seat 802 may be substantially a same size as the surface 112 of the seat 110 of the wireless power transmitting device 100. The wireless power transmitting device 800 may be positioned in a vertical orientation and have an active area 810. The wireless power transmitting device 800 may be designed to support the first wireless power receiving device 610 when the first wireless power receiving device 610 is in contact with the single barrier 806. The single barrier 806 may be configured to act as a guide for one side of the first wireless power receiving device 610 for placement of the first wireless power receiving device 610 over an active area 810 of the wireless power transmitting device 800. The wireless power transmitting device 800 may also be designed to operate in a flat orientation or a vertical orientation (e.g., when a short side of the wireless power transmitting device 800 proximate to the single barrier 806 is in contact with a resting surface and a long side of the wireless power transmitting device is at an angle with respect to the resting surface).

When a long side of the first wireless power receiving device 610 is placed on the surface 804 of the seat 802 and is in contact with the single barrier 806, the first wireless power receiving device 610 may be supported by the single barrier 806 coupled to the surface 804 of the seat 802. When the first wireless power receiving device 610 is placed in a horizontal orientation, a user of the first wireless power receiving device 610 needs to place the first wireless power receiving device 610 on the single barrier 806 and manually align the first wireless power receiving device 610 is centered on the single barrier 806. By centering the first wireless power receiving device 610 on the single barrier 806, the first reception area 614 of the first wireless power receiving device 610 may be aligned with an active area 810 of the wireless power transmitting device 800. However, because the single barrier 806 only acts as a guide for a single side of the first wireless power receiving device 610, user mistakes in positioning the first wireless power receiving device 610 along the single barrier 806 may result in misalignment of the active area 810 and the reception area 614.

When the first wireless power receiving device 610 of FIG. 8B is placed in a vertical orientation on the surface 804 of the seat 802, the first wireless power receiving device 610 may be supported by the single barrier 806. To align the first reception area 614 of the first wireless power receiving device 610 with an active area 810 of the wireless power transmitting device 800, the user of the first wireless power receiving device 610 in the vertical orientation needs to place the first wireless power receiving device 610 on the single barrier 806 and manually align the first wireless power receiving device 610 to be centered on the single barrier 806.

When the first wireless power receiving device 610 of FIG. 8B is in the horizontal orientation, the first reception area 614 is aligned with a different portion of the active area 810 as compared to when the first reception area 614 is aligned with the active area 810 when the first wireless power receiving device 610 is in the vertical orientation. Accordingly, the active area 810 of the wireless power transmitting device 800 needs to be larger than the first reception area 614 of the first wireless power receiving device 610 to accommodate the first wireless power receiving device 610 in both the horizontal orientation and the vertical orientation. The active area 140 may be smaller than the active area 810 to accommodate the first wireless power receiving device 610 both the horizontal orientation and the vertical orientation. Because the active area 140 is smaller than the active area 810, the wireless power transmitting device 100 may include fewer components, such as fewer electromagnetic coils, than the wireless power transmitting device 800. By including fewer components, a cost producing the wireless power transmitting device 100 may be less than a cost of producing the charging pad. Additionally, the wireless power transmitting device 800 may be prone to user mistakes when the first wireless power receiving device 610 is to be manually aligned on the single barrier 806. The user mistakes may result in misalignment of the active area 810 and the first reception area 614 as compared with the protrusion 120 which facilitates alignment of the first reception area 614 and the active area 140 due to the first portion 122 and the second portion 124.

Figure 9A:
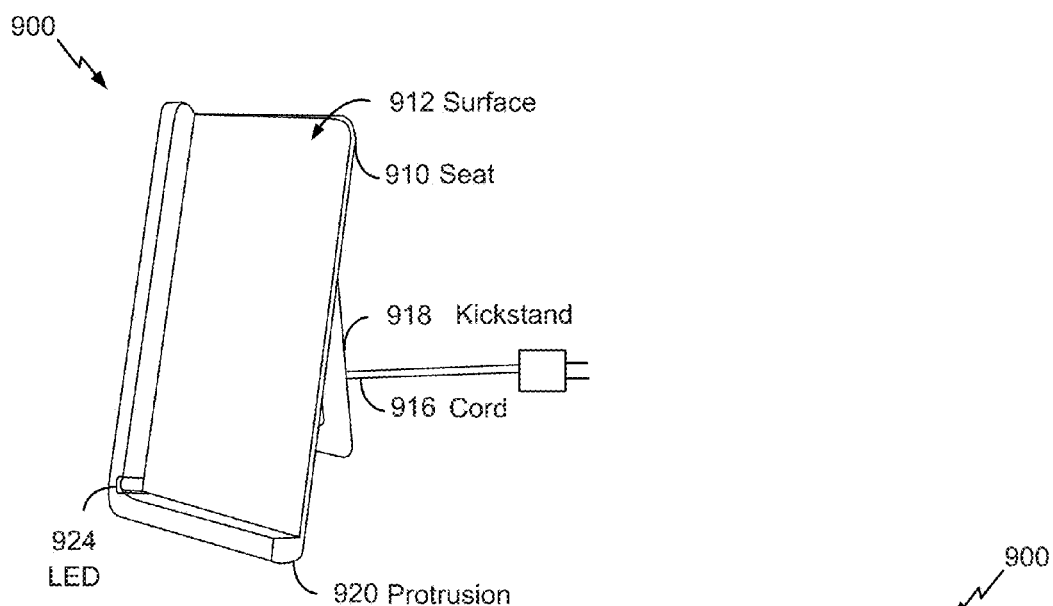
FIGS. 9A-C are views of another illustrative embodiment of a wireless power transmitting device.
Figure 9B:
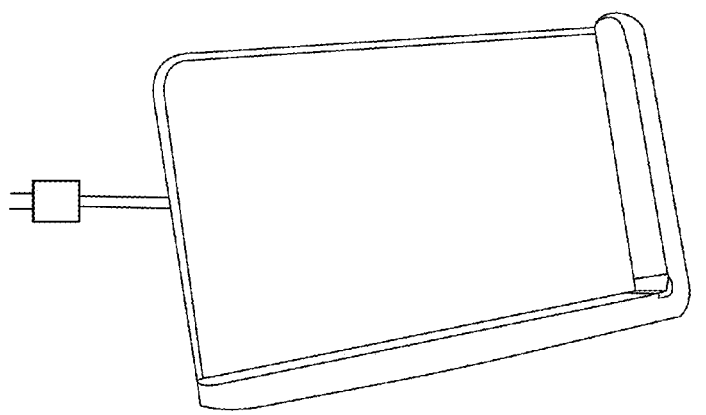
Figure 9C:
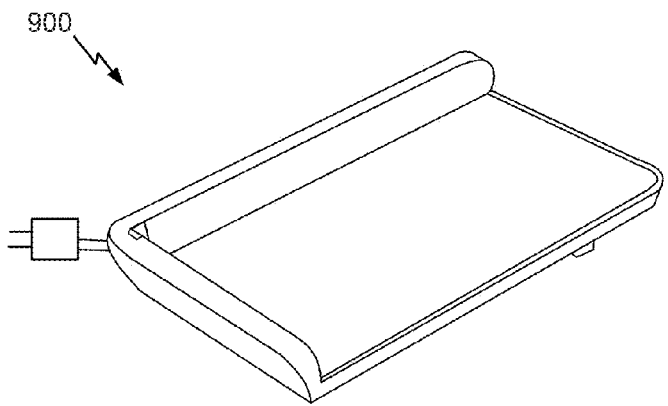

Referring to FIGS. 9A-C, another illustrative example of a wireless power transmitting device 900 is depicted. The wireless power transmitting device 900 may correspond to the wireless power transmitting device 100 of FIG. 1A. For example, the wireless power transmitting device 900 may operate in a similar manner as described with reference to the wireless power transmitting device 100. FIG. 9A shows a vertical orientation of the wireless power transmitting device 900, FIG. 9B shows a horizontal orientation of the wireless power transmitting device 900, and FIG. 9C shows a flat orientation of the wireless power transmitting device 900.

The wireless power transmitting device 900 may include a seat 910, at least one protrusion (e.g., a protrusion 920), a kickstand 918, a light emitting diode (LED) 924, and a power cord 916. The seat 910 may have a surface 912 and may accommodate at least one wireless power receiving device, such as the wireless power receiving device 160 of FIG. 1C, the first wireless power receiving device 610 or the second wireless power receiving device 620 of FIG. 6. The power cord 916 may be configured to be coupled to a power source. The LED 924 may provide an indication of when the wireless power transmitting device 900 is wirelessly transferring power to at least one wireless power receiving device. The seat 910, the protrusion 920, the kickstand 918, and the surface 912 may correspond to the seat 110, the protrusion 120, the kickstand 118, and the surface 112, respectively, of the wireless power transmitting device 100 of FIG. 1A.

Figure 10:
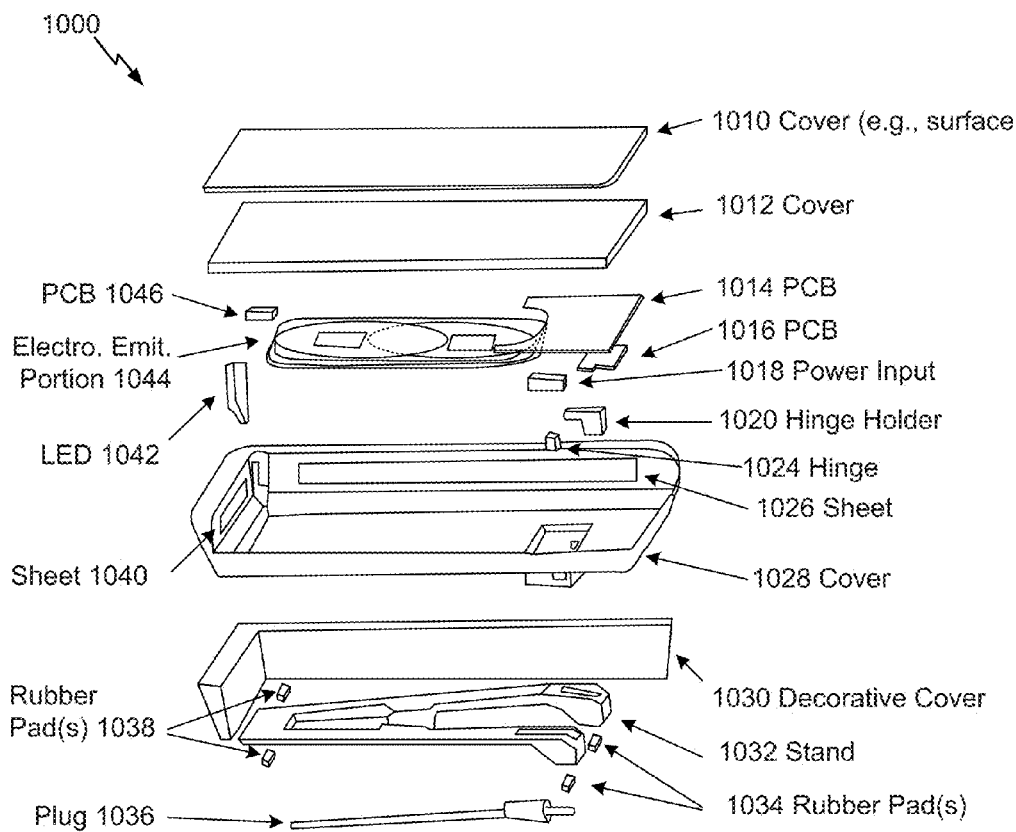
FIG. 10 is an illustrative assembly drawing of an embodiment of the wireless power transmitting device of FIGS. 9A-C.

Referring to FIG. 10, an illustrative assembly drawing 1000 of the wireless power transmitting device 900 is depicted. The wireless power transmitting device 900 may include a first cover 1010 and a second cover 1012. The first cover may provide or correspond to the surface 112 of FIG. 1A or the surface 912 of FIG. 9. The wireless power transmitting device 900 may further include one or more printed circuit boards 1014, 1046, and 1016, an electromagnetic emitting portion 1044, a power input 1018 (e.g., a direct current (DC) power input), and a light emitting diode (LED) 1042. The LED 1042 may correspond to the LED 924 of FIG. 9. One or more of the printed circuit boards 1014, 1046, and 1016 may be configured to regulate and/or transform a power supplied via the power input 1018. For example, power may be supplied to the power input 1018 via a power cord 1036, such as a DC plug. For example, the power cord 1036 may correspond to the power cord 916 of FIG. 9A. The electromagnetic emitting portion 1044 may include a number of coils. For example, the electromagnetic emitting portion 1044 may include two coils. The electromagnetic emitting portion 1044 may include or correspond to the electromagnetic emitting portions 224, 234 of FIG. 2, such as the electromagnetic emitting portion 290.

One or more of the printed circuit boards 1014, 1046, and 1016 and the electromagnetic emitting portion 1044 may be included in a wireless transmitter, such as the wireless transmitter 130 of FIG. 1B or the wireless transmitter 210 of FIG. 2. One or more of the printed circuit boards 1014, 1046, and 1016 and the electromagnetic emitting portion 1044 may be included in a wireless communication system configured to communicate with a wireless power receiving device. Alternatively or additionally, one or more of the printed circuit boards 1014, 1046, and 1016 may include a controller, such as the controller 218 of FIG. 2, to determine whether the electromagnetic emitting portion 1044 is providing power to the wireless power receiving device. When the electromagnetic emitting portion 1044 is providing power to the wireless power receiving device, the LED 1042 may be illuminated.

The wireless power transmitting device 900 may include a cover 1028 and a decorative cover 1030 that is coupled to the cover 1028. The cover 1028 may correspond to the seat 910 and may include the protrusion 920. The decorative cover 1030, the first cover 1010, the second cover 1012, the one or more printed circuit boards 1014, 1046, and 1016, the electromagnetic emitting portion 1044, the power input 1018, the light emitting diode (LED) 1042, the sheets 1026, 1040, or a combination thereof may be coupled to or included in the cover 1028. The sheets 1026, 1040 may attach to the cover 1028.

A hinge 1024 and a hinge holder 1020 may be included in the cover 1028 and coupled to the stand 1032, such as the kickstand 918. Rubber pads 1034, 1038 may be coupled to the stand 1032, the cover 1028, the decorative cover 1030, or a combination thereof.

Figure 11:
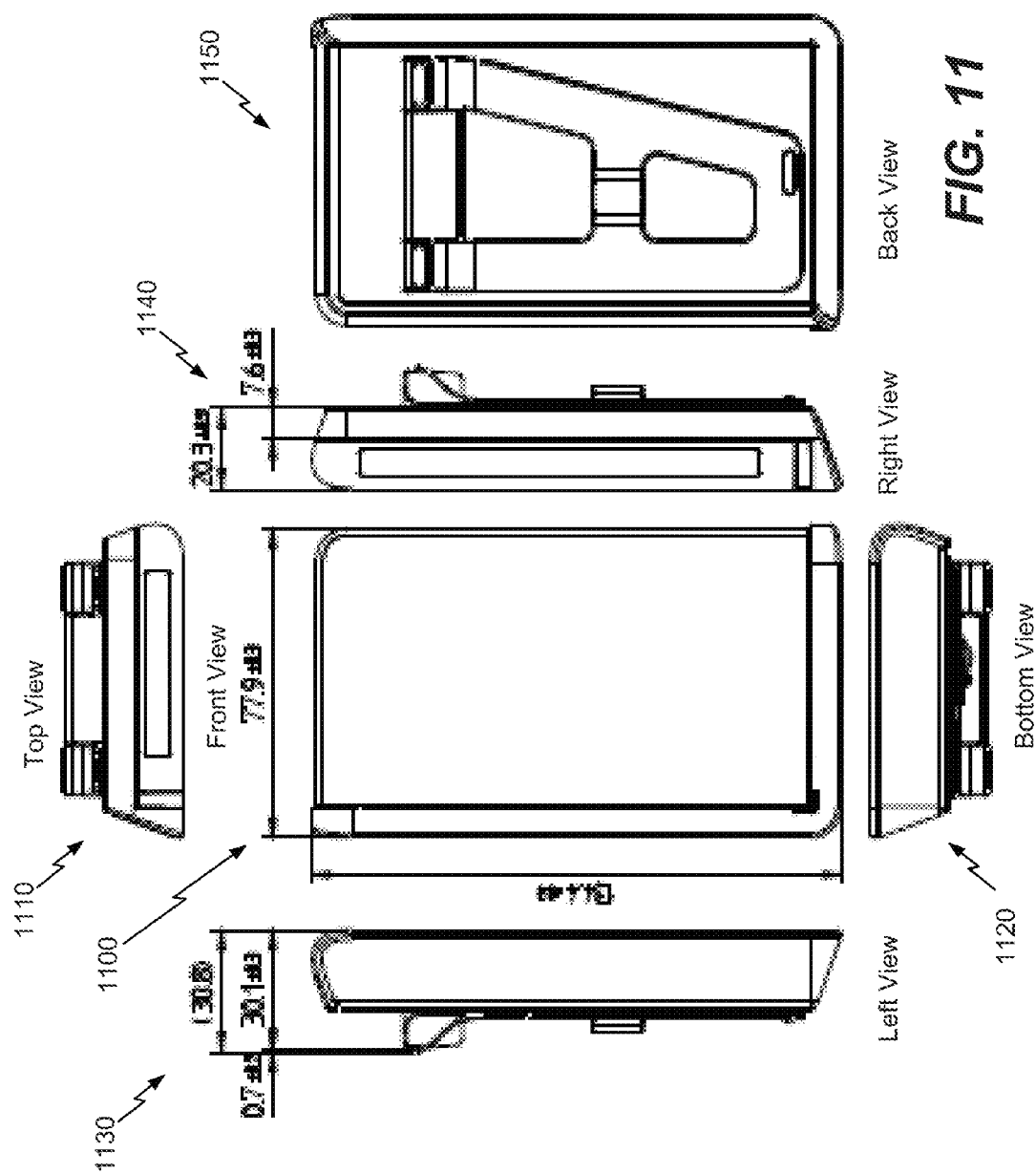
FIG. 11 is an illustration of different views of an embodiment of the wireless power transmitting device of FIGS. 9A-C.

Referring to FIG. 11, different illustrative views of the wireless power transmitting device 900 constructed according to the assembly drawing 1000 are shown. For example, the different illustrative views of the wireless power transmitting device 900 include a front view 1100, a top view 1110, a bottom view 1120, a left side view 1130, a right side view 1140, and a back view 1150.

Figure 12:
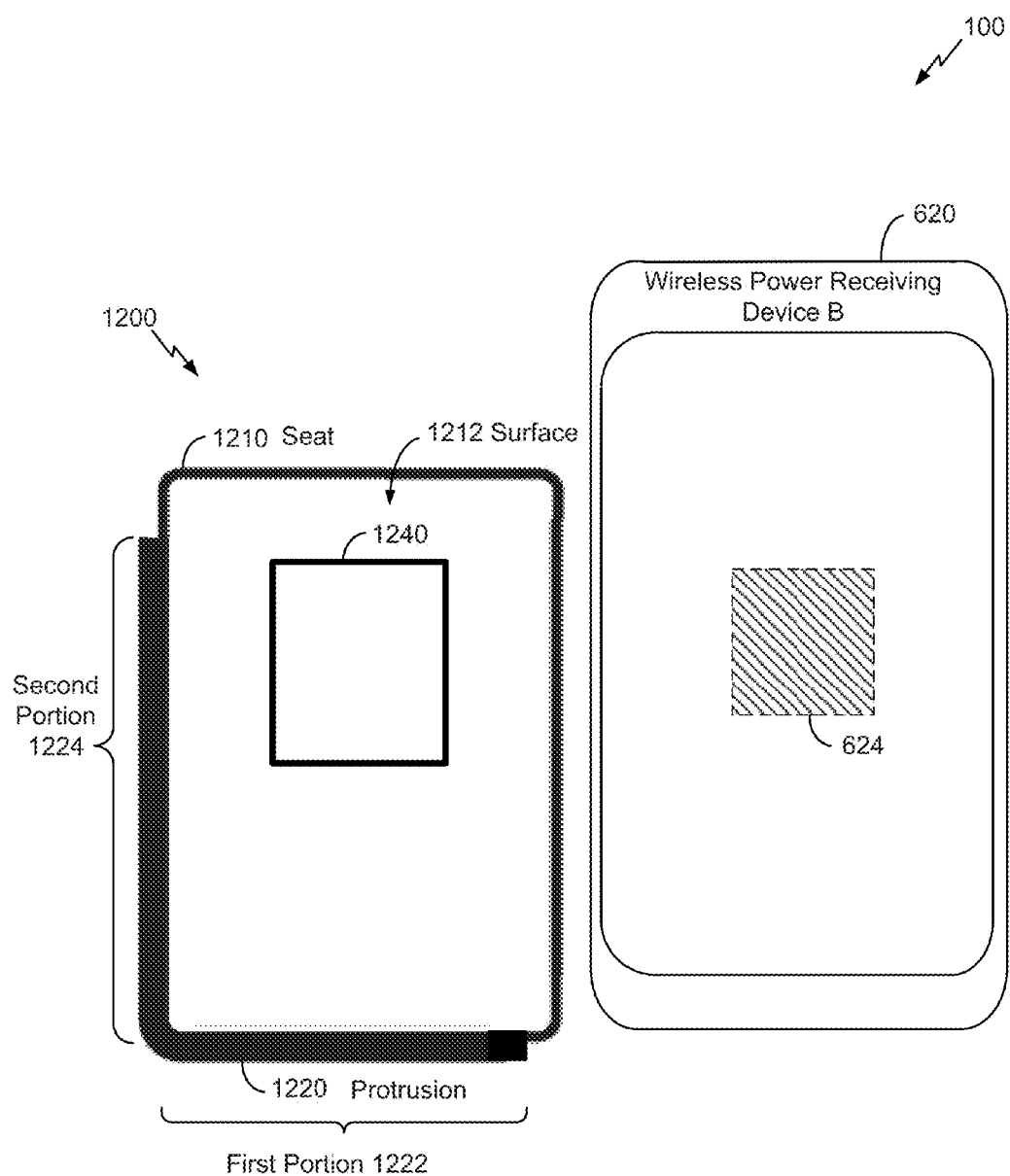
FIGS. 12 and 13 are illustrative embodiments of wireless power transmitting devices.

Referring to FIG. 12, another illustrative embodiment of a wireless power transmitting device 1200 is depicted. In FIG. 12, the wireless power transmitting device 1200 is depicted next to the second wireless power receiving device 620 of FIG. 6. The wireless power transmitting device 1200 may correspond to the wireless power transmitting device 100 of FIG. 1A or the wireless power transmitting device 900 of FIG. 9. For example, the wireless power transmitting device 1200 may operate in a similar manner as described with reference to the wireless power transmitting device 100.

The wireless power transmitting device 1200 includes a seat 1210 having a surface 1212, at least one protrusion (e.g., a protrusion 1220), and an active area 1240. The protrusion 1220 may include a first portion 1222 and a second portion 1224 that are configured to guide the second wireless power receiving device 620 so that the second reception area 624 of the second wireless power receiving device 620 is aligned with the active area 1240. An area of the surface 1212 may be less than an area of the second wireless power receiving device 620 (e.g., the wireless power transmitting device 1200 may be smaller than the second wireless power receiving device 620).

The second wireless power receiving device 620 may be placed on the seat 1210 of the wireless power transmitting device 1200 and guided into a position by the protrusion 1220. For example, the second wireless power receiving device 620 may be guided by the protrusion 1220 into the position such that a first side of the second wireless power receiving device 620 is touching the first portion 1222 and a second side of the second wireless power receiving device 620 is touching the second portion 1224. When the second wireless power receiving device 620 is guided into the position by the protrusion 120, the second reception area 624 of the second wireless power receiving device 620 may be aligned with the active area 1240 of the wireless power transmitting device 100 to enable wireless transmission of power from the wireless power transmitting device 1200 to the second wireless power receiving device 620.

Figure 13:
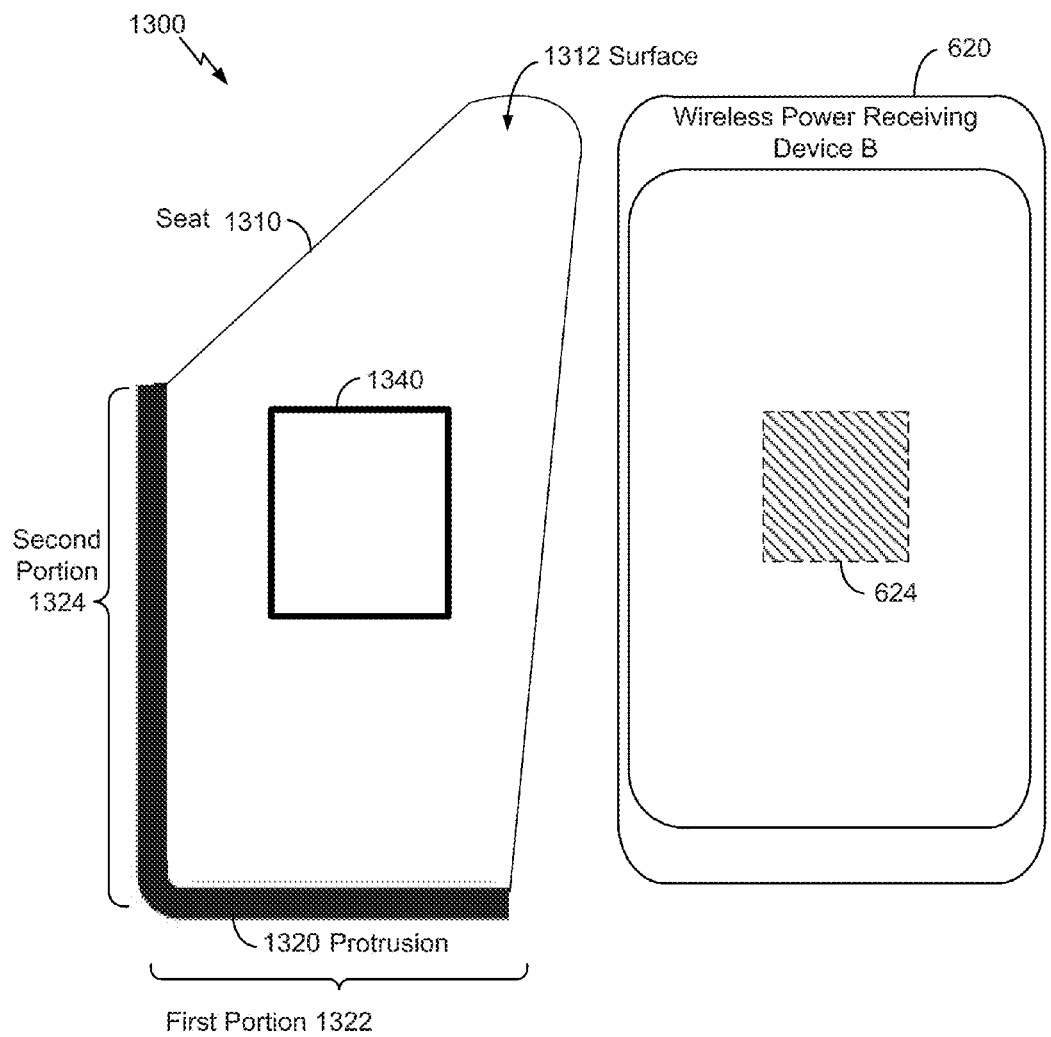

Referring to FIG. 13, another illustrative embodiment of a wireless power transmitting device 1300 is depicted. In FIG. 13, the wireless power transmitting device 1300 is depicted next to the second wireless power receiving device 620 of FIG. 6. The wireless power transmitting device 1300 may correspond to the wireless power transmitting device 100 of FIG. 1A, the wireless power transmitting device 900 of FIG. 9, or the wireless power transmitting device 1200 of FIG. 12. For example, the wireless power transmitting device 1300 may operate in a similar manner as described with reference to the wireless power transmitting device 100.

The wireless power transmitting device includes a seat 1310 having a surface 1312, at least one protrusion (e.g., a protrusion 1320), and an active area 1340. The protrusion 1320 may include a first portion 1322 and a second portion 1324 that are configured to guide the second wireless power receiving device 620 so that the second reception area 624 of the second wireless power receiving device 620 is aligned with the active area 1340. An area of the surface 1312 may be less than an area of the second wireless power receiving device 620. The surface 1312 may be any shape that enables alignment of an active area 1340 with a reception area 624 of the second wireless power receiving device 620.

The second wireless power receiving device 620 may be placed on the seat 1310 and guided into a position by the protrusion 1320. For example, the second wireless power receiving device 620 may be guided by the protrusion 1320 into the position such that a first side of the second wireless power receiving device 620 is touching the first portion 1322 and a second side of the second wireless power receiving device 620 is touching the second portion 1324. When the second wireless power receiving device 620 is guided into the position by the protrusion 1320, the second reception area 624 of the second wireless power receiving device 620 may be aligned with the active area 1340 to enable wireless transmission of power from the wireless power transmitting device 1300 to the second wireless power receiving device 620.

FIGS. 14A-D depict illustrative examples of wireless power transmitting devices. The wireless power transmitting devices depicted in FIGS. 14A-D may correspond to the wireless power transmitting device 100 of FIG. 1A, the wireless power transmitting device 900 of FIG. 9, the wireless power transmitting device 1200 of FIG. 12, or the wireless power transmitting device 1300 of FIG. 13, as illustrative, non-limiting examples.

Figure 14A:
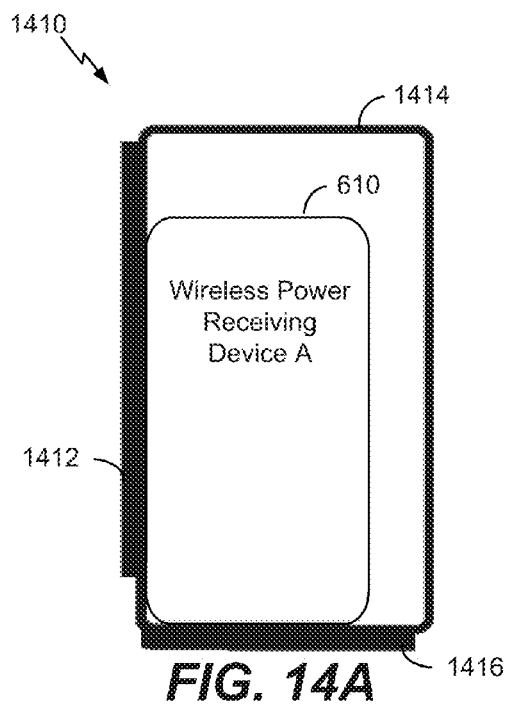
FIGS. 14A-D are views of illustrative embodiments of wireless power transmitting devices.

Referring to FIG. 14A, a wireless power transmitting device 1410 includes two protrusions (e.g., a first protrusion 1416 and a second protrusion 1412). The first protrusion 1416 (e.g., a first barrier) and the second protrusion 1412 (e.g., a second barrier) may each be in a fixed position. For example, a first position of the first protrusion 1416 on a seat 1414 of the wireless power transmitting device 1420 may be non-adjustable. The first protrusion 1416 and the second protrusion 1412 may operate together to guide the first wireless power receiving device 610. Although both the first protrusion 1416 (e.g., the first barrier) and the second protrusion 1412 (e.g., the second barrier) are depicted in FIG. 14A as being continuous barriers, at least one of the first protrusion 1416 and the second protrusion 1412 may be a non-continuous barrier (including multiple sub-barriers, as described with reference to FIG. 14D).

Figure 14B:
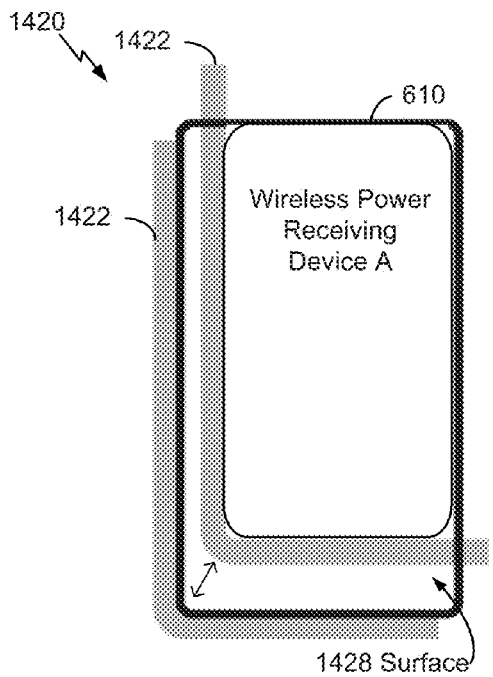

Referring to FIG. 14B, a wireless power transmitting device 1420 includes at least one protrusion (e.g., an adjustable protrusion 1422). The adjustable protrusion 1422 may be set in a position based on a model of the wireless power receiving device to be received by the wireless power transmitting device 1420. The adjustable protrusion 1422 may operate to guide the first wireless power receiving device 610. Although the adjustable protrusion 1422 is shown as a single adjustable protrusion, the wireless power transmitting device 1420 may include one or more adjustable protrusions or a combination of adjustable and fixed protrusions. Although the adjustable protrusion 1422 is illustrated as extending a full length and a full width of a surface 1428 of the wireless power transmitting device 1420, the adjustable protrusion 1422 may extend less than a full length of the surface 1428, less than a full width of the surface 1428, or a combination thereof.

Figure 14C:
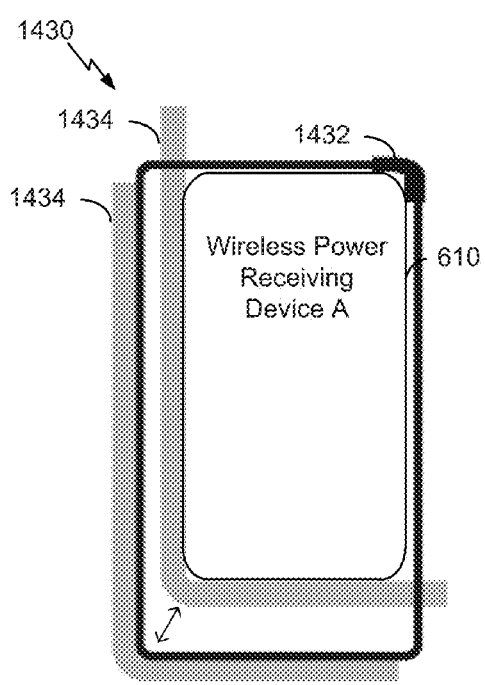

Referring to FIG. 14C, a wireless power transmitting device 1430 includes two protrusions (e.g., a fixed protrusion 1432 and an adjustable protrusion 1434). The adjustable protrusion 1434 may be set in a position based on a model of the wireless power receiving device to be received by the wireless power transmitting device 1430. When a wireless power receiving device is placed on the wireless power transmitting device 1430, a first side and a second side of the wireless power receiving device may be touching the adjustable protrusion 1434, and a third side and a fourth side of the wireless power receiving device may be touching the fixed protrusion 1432.

Figure 14D:
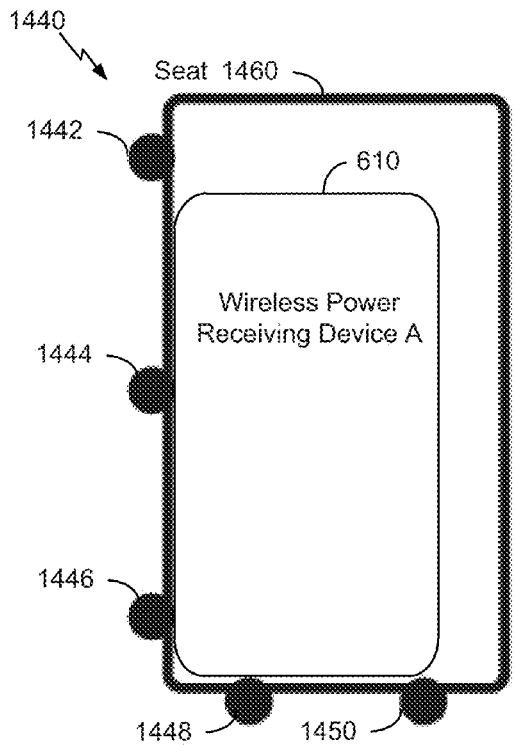

Referring to FIG. 14D, a wireless power transmitting device 1440 includes a seat 1460 and multiple protrusions 1442-1450. As an illustrative example, one or more of the multiple protrusions 1442-1450 may be posts. The multiple protrusions 1442-1450 may be grouped into a first group of protrusions 1442-1446 that are positioned proximate to a first side of the seat 1460 and a second group of protrusions 1448-1450 that are positioned proximate to a second side of the seat 1460. The first group of protrusions 1442-1450 may operate together as a first barrier, and the second group of protrusions may operate together as a second barrier. When the first group of protrusions 1442-1450 operate together as a first barrier, the first barrier is a non-continuous barrier (the first barrier includes multiple sub-barriers (e.g., each of the protrusions 1442-1450). Although each of the first group of protrusions 1442-1446 and the second group of protrusions 1448-1450 are depicted as including a plurality of protrusions, a group of protrusions may include a single protrusion. When the first group of protrusions 1442-1446 and the second group of protrusions 1448-1450 may operate together to guide the first wireless power receiving device 610.

Referring to FIGS. 15A-B and 16A-B, illustrative examples of wireless power transmitting devices configured to concurrently provide power to multiple wireless power receiving devices are depicted. Each of wireless power transmitting devices may include multiple portions that are each configured to charge a wireless power receiving device. Each of the multiple portions may correspond to one of the wireless power transmitting device 100 of FIG. 1A, the wireless power transmitting device 900 of FIG. 9, the wireless power transmitting device 1200 of FIG. 12, the wireless power transmitting device 1300 of FIG. 13, one of the wireless power transmitting devices 1410, 1420, 1430, 1440 of FIG. 14A-D, or a combination thereof. For example, each of the multiple portions may include a corresponding active area and may be associated with at least one protrusion to guide a wireless power receiving device such that a reception area of the wireless power receiving device is aligned with the active area. Multiple active areas of a particular wireless power transmitting device may be controlled by a single controller, such as the controller 218 of FIG. 2, or by multiple controllers. For example, each active area may have a corresponding controller or multiple active areas may share a controller. Each of the wireless power transmitting devices of FIGS. 15A-B and 16A-B may optionally include a kickstand, such as the kickstand 118 of FIG. 1A or the kickstand 918 of FIG. 9.

Figure 15A:
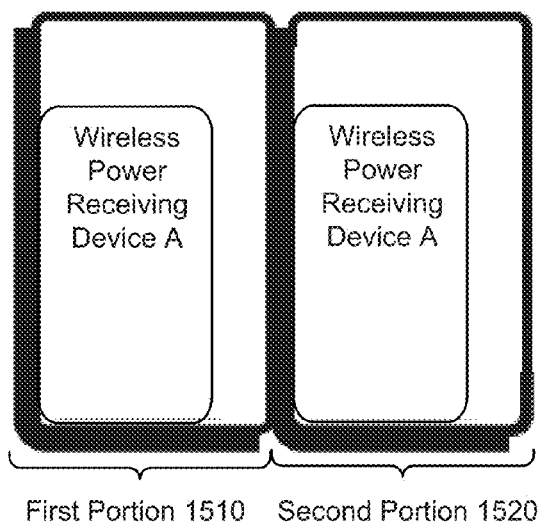
FIGS. 15A-B and 16A-B are views of illustrative embodiments of wireless power transmitting devices.

Referring to FIG. 15A, a first wireless power transmitting device 1500 is configured to concurrently provide power to multiple wireless power receiving devices. For example, the first wireless power transmitting device 1500 may include a first portion 1510 to provide power to a first wireless power receiving device and a second portion 1520 to provide power to a first wireless power receiving device. As illustrated in FIG. 15A, each of the first portion 1510 and the second portion 1520 include at least one protrusion (e.g., a corresponding L-shaped protrusion).

Figure 15B:
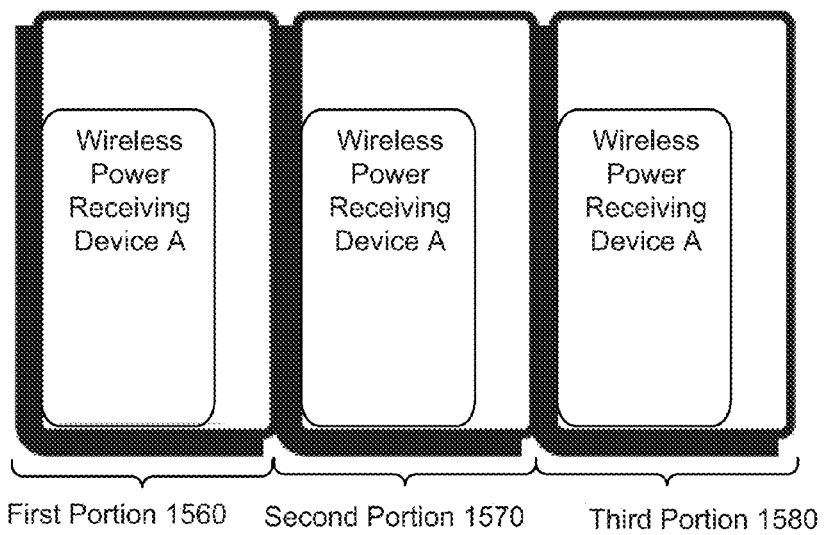

Referring to FIG. 15B, a second wireless power transmitting device 1550 is configured to concurrently provide power to multiple wireless power receiving devices. For example, the second wireless power transmitting device 1550 may include a first portion 1560 to provide power to a first wireless power receiving device, a second portion 1570 to provide power to a second wireless power receiving device, and a third portion 1580 to provide power to a third wireless power receiving device. As illustrated in FIG. 15B, each of the first portion 1560, the second portion 1570, and the third portion 1580 include at least one protrusion (e.g., a corresponding L-shaped protrusion).

Figure 16A:
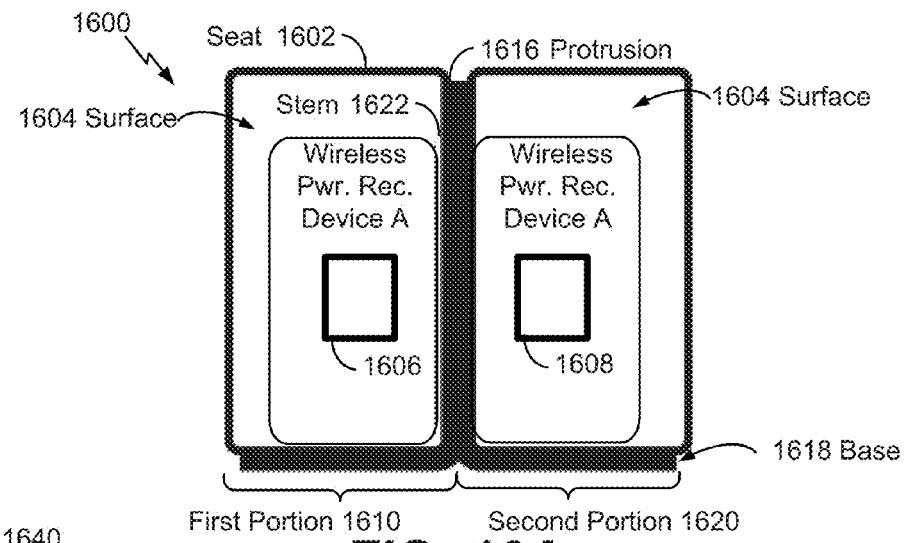

Referring to FIG. 16A, a third wireless power transmitting device 1600 is configured to concurrently provide power to multiple wireless power receiving devices. The third wireless power transmitting device 1600 may include a seat 1602 having a surface 1604. The third wireless power transmitting device 1600 may include a first portion 1610 to provide power to a first wireless power receiving device and a second portion 1620 to provide power to a second wireless power receiving device. The first portion 1610 may be associated with a first active area 1606 and the second portion 1620 may be associated with a second active area 1608. As illustrated in FIG. 16A, the third wireless power transmitting device 1600 includes at least one protrusion (e.g., a protrusion 1616 that is an inverse T-shaped barrier). The protrusion 1616 may include a base 1618 and a stem 1622. At least one wireless power receiving device may rest against the base 1618 on each side of the stem 1622. When a first wireless power receiving device is placed on the first portion 1610, the first wireless power receiving device may touch the stem 1622 and a portion of the base 1618 associated with the first portion 1610. When a second wireless power receiving device is placed on the second portion 1620, the second wireless power receiving device may touch the stem 1622 and a portion of the base 1618 associated with the second portion 1620. Accordingly, the protrusion 1616 (e.g., the at least one protrusion) is located and an active area 1606, 1608 is configured so as to accommodate on the seat 1602, and enable wireless transfer of power (e.g., charging), at least one wireless power receiving device on each side of the protrusion 1616.

Figure 16B:
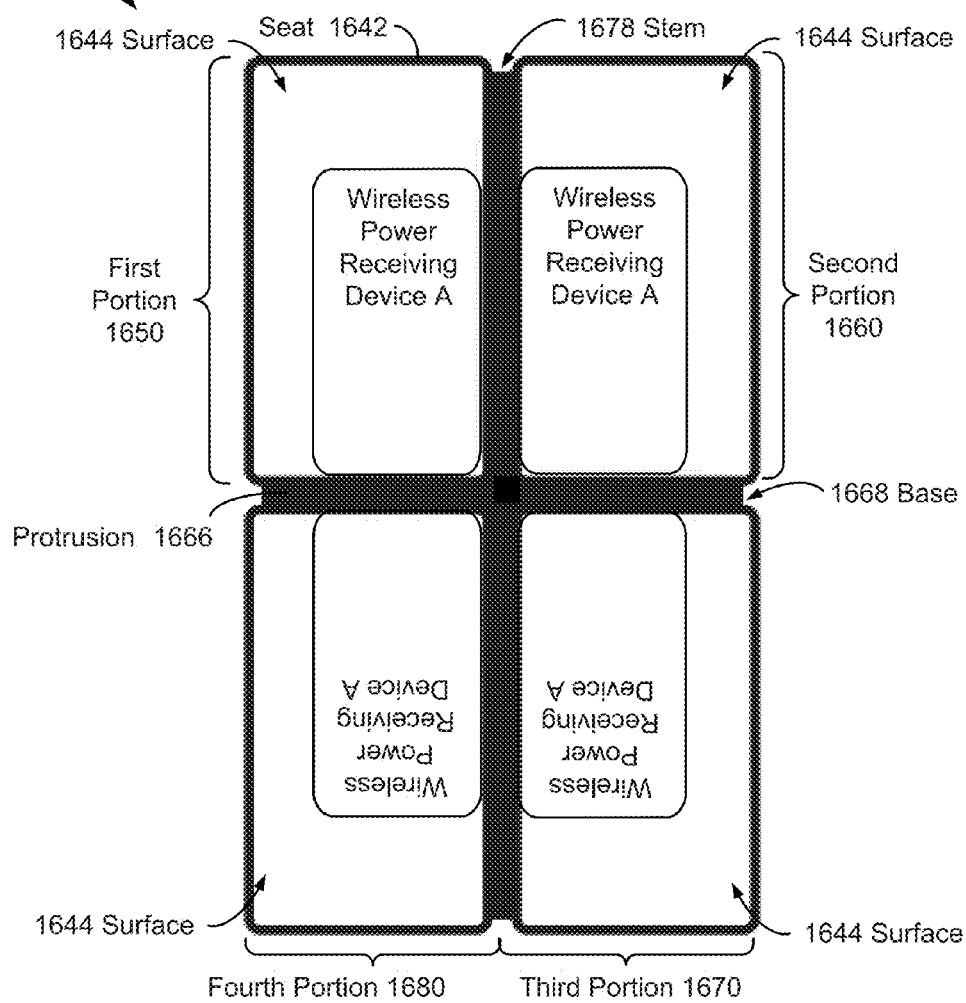

Referring to FIG. 16B, a fourth wireless power transmitting device 1640 is configured to concurrently provide power to multiple wireless power receiving devices. The fourth wireless power transmitting device 1640 may include a seat 1642 having a surface 1644. The fourth wireless power transmitting device 1640 may include a first portion 1650 to provide power to a first wireless power receiving device, a second portion 1660 to provide power to a second wireless power receiving device, a third portion 1670 to provide power to a third wireless power receiving device, and a fourth portion 1680 to provide power to a fourth wireless power receiving device. As illustrated in FIG. 16B, the fourth wireless power transmitting device 1640 includes at least one protrusion (e.g., a protrusion 1666 that is a cross-shaped, such as a T-shape and an inverse T-shapes sharing a common base). The protrusion 1666 may sit on the surface 1644 of the seat 1642. The protrusion 1666 may include a base 1668 and a stem 1678. Accordingly, a particular wireless power receiving device may rest against each side of the base 1668 on each side of the stem 1678 depending on which portion (e.g., the first portion 1650, the second portion 1660, the third portion 1670, or the fourth portion 1680) of the fourth wireless power transmitting device 1640 the particular wireless power receiving device is placed.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A wireless power transmitting device comprising:
a wireless transmitter with an electromagnetic-energy emitting portion; and
a seat having a first structure, a second structure, and an active area that contains the electromagnetic-energy emitting portion,
wherein the first structure and the second structure are configured to align at least one wireless power receiving device in a first direction and a second direction for placement, over the active area, of the at least one wireless power receiving device and to enable an unobstructed view of at least one surface of the at least one wireless power receiving device upon alignment of the at least one wireless power receiving device over the active area,
wherein the first structure is further configured to align the at least one wireless power receiving device over the active area in the first direction while the at least one wireless power receiving device is moved in the second direction,
wherein the second structure is further configured to align the at least one wireless power receiving device over the active area in the second direction while the at least one wireless power receiving device is moved in the first direction,
wherein the first direction is substantially perpendicular to the second direction, and
wherein the placement of the at least one wireless power receiving device over the active area enables transferring of power to the at least one wireless power receiving device.

2. The wireless power transmitting device of claim 1, wherein the second structure comprises a barrier and a protrusion, wherein the barrier adjoins a first edge of the wireless power transmitting device, and wherein the protrusion adjoins a second edge of the wireless power transmitting device.

3. The wireless power transmitting device of claim 1, wherein the second structure comprises at least one protrusion, and wherein the at least one protrusion and the active area are configured to enable charging of one or more wireless power receiving devices on each side of the at least one protrusion.

4. The wireless power transmitting device of claim 1, wherein the active area is configured to enable transferring of the power to the at least one wireless power receiving device even when the at least one wireless power receiving device is partially misaligned over the active area.

5. The wireless power transmitting device of claim 1, wherein the active area is configured to transfer power to multiple wireless power receiving devices having different dimensions.

6. The wireless power transmitting device of claim 1, wherein the seat is configured to accommodate a particular wireless power receiving device at multiple orientations of the particular wireless power receiving device.

7. The wireless power transmitting device of claim 6, wherein the second structure is further configured to at least partially support the at least one wireless power receiving device when placed on the seat while the seat is in a horizontal orientation, a vertical orientation, or any other angle.

8. The wireless power transmitting device of claim 1, wherein the second structure includes a first barrier and a second barrier.

9. The wireless power transmitting device of claim 8, wherein the first barrier is oriented at a non-zero angle with respect to the second barrier.

10. The wireless power transmitting device of claim 9, wherein the non-zero angle is about ninety degrees.

11. The wireless power transmitting device of claim 8, wherein the first barrier and the second barrier form a continuous barrier.

12. The wireless power transmitting device of claim 8, wherein at least one of the first barrier or the second barrier comprises a non-continuous barrier.

13. The wireless power transmitting device of claim 12, wherein the first barrier comprises a non-continuous barrier that includes multiple sub-barriers.

14. The wireless power transmitting device of claim 8, wherein a first position of the first barrier on the seat and a second position of the second barrier on the seat are non-adjustable.

15. The wireless power transmitting device of claim 8, wherein at least one of a first position of the first barrier on the seat or a second position of the second barrier on the seat is adjustable.

16. The wireless power transmitting device of claim 8, wherein the first barrier is coupled to the seat proximate to a first edge of the first structure, and wherein the second barrier is coupled to the seat proximate to a second edge of the first structure that is adjacent to the first edge.

17. The wireless power transmitting device of claim 1, wherein the first structure and the second structure are further configured to support the at least one wireless power receiving device in a vertical orientation when the seat is in contact with a resting surface along a first edge of the seat and is inclined with respect to the resting surface.

18. The wireless power transmitting device of claim 1, wherein an angle of orientation between the wireless power transmitting device and a resting surface on which the wireless power transmitting device is placed is adjustable without interrupting power transmission to the at least one wireless power receiving device during adjustment of the angle.

19. The wireless power transmitting device of claim 18, wherein a rate of power transfer of the power transmission is unaffected by the adjustment of the angle.

20. The wireless power transmitting device of claim 1, wherein the second structure comprises a first wall and a second wall, the second wall oriented at an angle of about ninety degrees with respect to the first wall.

21. The wireless power transmitting device of claim 1, wherein the second structure comprises a first post and a second post.

22. The wireless power transmitting device of claim 1, wherein the second structure comprises a first group of posts and a second group of posts.

23. The wireless power transmitting device of claim 1, wherein the first structure and the second structure are further configured to oppose movement of the at least one wireless power receiving device in the first direction and the second direction for placement of the at least one wireless power receiving device over the active area.

24. The wireless power transmitting device of claim 1, wherein the first structure and the second structure are further configured to guide a reception area of the at least one wireless power receiving device into alignment with the active area upon contact of the at least one wireless power receiving device with the first structure and the second structure.

25. The wireless power transmitting device of claim 1, wherein the at least one surface adjoins a first corner, a second corner, a third corner, and a fourth corner of the at least one wireless power receiving device, and wherein the first structure and the second structure are further configured to enable an unobstructed view of an entire extent of the at least one surface upon contact of the at least one wireless power receiving device with the first structure and the second structure.

26. The wireless power transmitting device of claim 1, further comprising a kickstand device configured to enable adjustment of an angle of inclination of the wireless power transmitting device and a resting surface.

27. The wireless power transmitting device of claim 1, wherein:
   the at least one wireless power receiving device includes a first wireless power receiving device that has a first size,
   the first structure and the second structure are further configured to align a second wireless power receiving device over the active area upon contact of the second wireless power receiving device with the first structure and the second structure, and
   the second wireless power receiving device has a second size different than the first size.

28. An apparatus comprising:
   means for wirelessly transmitting electromagnetic energy to a wireless receiver of an electronic device to charge the electronic device;
   means for aligning the wireless receiver in a first direction over an active area of the means for wirelessly transmitting electromagnetic energy while the electronic device is moved in a second direction and for providing access to an extent of a front surface of the electronic device upon contact of the electronic device with the means for aligning the wireless receiver in the first direction; and
   means for aligning the wireless receiver in the second direction over the active area of the means for wirelessly transmitting electromagnetic energy while the electronic device is moved in the first direction and for providing access to the extent of the front surface upon contact of the electronic device with the means for aligning the wireless receiver in the second direction;
   wherein the first direction is substantially perpendicular to the second direction.

29. The apparatus of claim 28, wherein the means for aligning the wireless receiver in the first direction and the means for aligning the wireless receiver in the second direction are configured to align the electronic device over the active area upon contact of the electronic device with the means for aligning the wireless receiver in the first direction and the means for aligning the wireless receiver in the second direction.

* * * * *